US012744142B2

(12) United States Patent
Kudo et al.

(10) Patent No.: US 12,744,142 B2
(45) **Date of Patent: *Sep. 22, 2026**

(54) SOFT MAGNETIC POWDER, DUST CORE, MAGNETIC ELEMENT, AND ELECTRONIC DEVICE

(71) Applicant: SEIKO EPSON CORPORATION, Tokyo (JP)

(72) Inventors: Yasuko Kudo, Hachinohe (JP); Atsushi Nakamura, Hachinohe (JP)

(73) Assignee: SEIKO EPSON CORPORATION (JP)

( * ) Notice: Subject to any disclaimer, the term of this patent is extended or adjusted under 35 U.S.C. 154(b) by 552 days.

This patent is subject to a terminal disclaimer.

(21) Appl. No.: 18/182,706

(22) Filed: Mar. 13, 2023

(65) Prior Publication Data

US 2023/0290555 A1 Sep. 14, 2023

(30) Foreign Application Priority Data

Mar. 14, 2022 (JP) ................................ 2022-038813

(51) Int. Cl.
*H01F 1/36* (2006.01)
*H01F 3/08* (2006.01)

(52) U.S. Cl.
CPC ................. *H01F 1/36* (2013.01); *H01F 3/08* (2013.01)

(58) Field of Classification Search
CPC .......... H01F 1/36; H01F 3/08; H01F 1/15308; H01F 1/12; H01F 1/22
USPC .......................................................... 148/307
See application file for complete search history.

(56) References Cited

U.S. PATENT DOCUMENTS

| | | | | |
|---|---|---|---|---|
| 4,881,989 | A | 11/1989 | Yoshizawa et al. | |
| 4,985,089 | A | 1/1991 | Yoshizawa et al. | |
| 5,160,379 | A | 11/1992 | Yoshizawa et al. | |
| 5,252,148 | A | 10/1993 | Shigeta et al. | |
| 10,672,547 | B2 * | 6/2020 | Kudo | B22F 1/08 |
| 2010/0097171 | A1 | 4/2010 | Urata et al. | |
| 2010/0098576 | A1 | 4/2010 | Yoshizawa et al. | |
| 2010/0230010 | A1 * | 9/2010 | Yoshizawa | H01F 1/15333 148/403 |
| 2012/0199254 | A1 | 8/2012 | Urata et al. | |

(Continued)

FOREIGN PATENT DOCUMENTS

| | | | |
|---|---|---|---|
| CN | 101627141 | A | 1/2010 |
| CN | 103366913 | A | 10/2013 |

(Continued)

*Primary Examiner* — Sally A Merkling
*Assistant Examiner* — Nazmun Nahar Shams
(74) *Attorney, Agent, or Firm* — Harness, Dickey & Pierce, P.L.C.

(57) ABSTRACT

A soft magnetic powder contains a particle having a composition represented by $Fe_xCu_aNb_b(S_{1-y}B_y)_{100-x-a-b}$, a, b, and x being numbers whose units are atomic %, in which $0.3 \leq a \leq 2.0$, $2.0 \leq b \leq 4.0$, and $73.0 \leq x \leq 79.5$, and y being a number satisfying $f(x) \leq y \leq 0.99$, and $f(x)=(4\times10^{-34})x^{17.56}$. When an XPS spectrum of the particle is obtained, and fitting processing is performed on an O1s peak, the O1s peak is separated into a first element peak of 532 eV or less and a second element peak of more than 532 eV, and S2/S1 is 1.5 or more where S1 is an area of the first element peak and S2 is an area of the second element peak.

7 Claims, 10 Drawing Sheets

(56) References Cited

U.S. PATENT DOCUMENTS

| | | | | |
|---|---|---|---|---|
| 2013/0255836 | A1 | 10/2013 | Otsuka et al. | |
| 2013/0294129 | A1 | 11/2013 | Inaba | |
| 2016/0177429 | A1 | 6/2016 | Urata et al. | |
| 2017/0148554 | A1* | 5/2017 | Kudo | H01F 27/24 |
| 2018/0073117 | A1 | 3/2018 | Urata et al. | |
| 2018/0090252 | A1 | 3/2018 | Kudo | |
| 2019/0333663 | A1 | 10/2019 | Watanabe et al. | |
| 2020/0258667 | A1* | 8/2020 | Ikeda | C01B 33/14 |

FOREIGN PATENT DOCUMENTS

| | | | |
|---|---|---|---|
| CN | 107887097 | A | 4/2018 |
| EP | 0302355 | A1 | 2/1989 |
| EP | 2130936 | A1 | 12/2009 |
| JP | 63-304603 | A | 12/1988 |
| JP | H01-028301 | B2 | 6/1989 |
| JP | 01-241200 | A | 9/1989 |
| JP | H07-018388 | A | 1/1995 |
| JP | 2003-059710 | A | 2/2003 |
| JP | 2004-349585 | A | 12/2004 |
| JP | 2008-231463 | A | 10/2008 |
| JP | 4217997 | B2 | 2/2009 |
| JP | 2012-012699 | A | 1/2012 |
| JP | 2012-082476 | A | 4/2012 |
| JP | 5455040 | B2 | 3/2014 |
| JP | 2014-120699 | A | 6/2014 |
| JP | 2019-189928 | A | 10/2019 |

* cited by examiner

| | Si | B | Nb | C | N | O | Mn | Fe | Cu |
|---|---|---|---|---|---|---|---|---|---|
| COMPARATIVE EXAMPLE | 20.4 | 2.6 | 0.9 | 14.9 | 0.2 | 50.9 | 0.2 | 9.1 | 0.7 |
| EXAMPLE | 22.2 | 4.9 | 1.2 | 17.1 | 0.3 | 51.0 | 0.8 | 2.1 | 0.4 |

FIG. 17

| | Si | B | Nb | C | N | O | Mn | Fe | Cu |
|---|---|---|---|---|---|---|---|---|---|
| COMPARATIVE EXAMPLE | 13.9 | 4.0 | 0.7 | 24.8 | – | 45.8 | 0.2 | 9.9 | 0.8 |
| EXAMPLE | 15.9 | 7.1 | 1.2 | 24.3 | 0.9 | 45.5 | 0.2 | 4.5 | 0.6 |

SOFT MAGNETIC POWDER, DUST CORE, MAGNETIC ELEMENT, AND ELECTRONIC DEVICE

The present application is based on, and claims priority from JP Application Serial Number 2022-038813, filed Mar. 14, 2022, the disclosure of which is hereby incorporated by reference herein in its entirety.

BACKGROUND

1. Technical Field

The present disclosure relates to a soft magnetic powder, a dust core, a magnetic element, and an electronic device.

2. Related Art

In various mobile devices including a magnetic element including a dust core, in order to reduce a size and achieve a high output, it is necessary to cope with a high frequency of a conversion frequency and a high current of a switching power supply. Accordingly, a soft magnetic powder contained in the dust core is also required to cope with the high frequency and the high current.

In JP-A-2019-189928 discloses a soft magnetic powder having a composition represented by $Fe_xCu_aNb_b(Si_{1-y}B_y)_{100-x-a-b}$, [a, b and x are expressed by atomic %, and are numbers satisfying 0.3≤a≤2.0, 2.0≤b≤4.0 and 73.0≤x≤79.5, and Y is a number satisfying f(x)≤y≤0.99, and $f(x)=(4\times10^{-34})x^{17.56}$], and containing 30 vol % or more of a crystal structure having a grain size of 1.0 nm or more and 30.0 nm or less. According to such a soft magnetic powder, it is possible to reduce an iron loss at a high frequency by containing minute crystals.

However, the soft magnetic powder disclosed in JP-A-2019-189928 still has room for improvement in terms of stably implementing excellent soft magnetism while improving insulation between particles. Specifically, there is a demand for a green compact in which a high insulation resistance value and a high magnetic permeability are obtained when a green compact obtained by compacting the soft magnetic powder is produced.

SUMMARY

A soft magnetic powder according to an application example of the present disclosure contains:

a particle having a composition represented by $Fe_xCu_aNb_b(Si_{1-y}B_y)_{100-x-a-b}$, a, b, and x being numbers whose units are atomic %, in which 0.3≤a≤2.0, 2.0≤b≤4.0, and 73.0≤x≤79.5, and y being a number satisfying f(x)≤y≤0.99, and $f(x)=(4\times10^{-34})x^{17.56}$, in which the particle contains a crystal grain having a grain size of 1.0 nm or more and 30.0 nm or less, when an XPS spectrum of the particle is obtained by X-ray photoelectron spectroscopy and fitting processing of separating an O1s peak of the XPS spectrum into a plurality of different chemical states is performed, the O1s peak is separated into at least one first element peak having a peak top binding energy of 532 eV or less and at least one second element peak having a peak top binding energy of more than 532 eV, and S2/S1 is 1.5 or more, where S1 is a total area of the first element peak and S2 is a total area of the second element peak.

A dust core according to an application example of the present disclosure contains: the soft magnetic powder according to the application example of the present disclosure.

A magnetic element according to an application example of the present disclosure includes: the dust core according to the application example of the present disclosure.

An electronic device according to an application example of the present disclosure includes: the magnetic element according to the application example of the present disclosure.

BRIEF DESCRIPTION OF THE DRAWINGS

FIG. 17 is a table showing a result of qualitative quantitative analysis (result of qualitative quantitative analysis of Example) and a result of qualitative quantitative analysis of Comparative Example obtained for the soft magnetic powder according to the embodiment.

DESCRIPTION OF EXEMPLARY EMBODIMENTS

Figure 1:
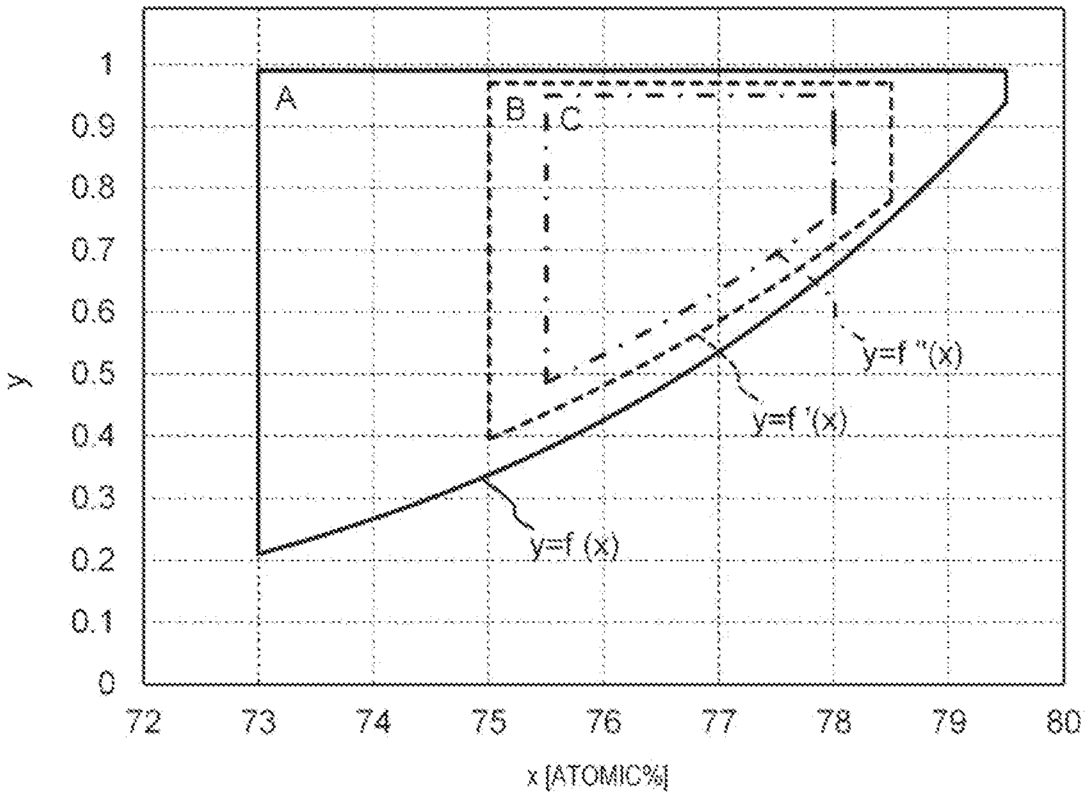
FIG. 1 is a diagram showing a region, in a two-axis orthogonal coordinate system in which x is a horizontal axis and y is a vertical axis, in which a range of x and a range of y in a compositional formula of a soft magnetic powder according to an embodiment overlap each other.

Hereinafter, a soft magnetic powder, a dust core, a magnetic element, and an electronic device according to the present disclosure will be described in detail based on a preferred embodiment shown in the accompanying drawings.

1. Soft Magnetic Powder

The soft magnetic powder according to the embodiment is a metal powder which exhibits soft magnetism. The soft magnetic powder can be applied to any application, and for example, is used for manufacturing various green compacts such as dust cores and electromagnetic wave absorbers in which particles are bound to each other via a binder.

The soft magnetic powder according to the embodiment contains a particle having a composition represented by $Fe_xCu_aNb_b\ (Si_{1-y}B_y)_{100-x-a-b}$.

a, b, and x are numbers whose units are atomic %. $0.3 \le a \le 2.0$, $2.0 \le b \le 4.0$, and $73.0 \le x \le 79.5$.

$f(x) \le y \le 0.99$. $f(x)=(4\times10^{-34})x^{17.56}$.

Further, the particle contained in the soft magnetic powder according to the embodiment contains a crystal grain having a grain size of 1.0 nm or more and 30.0 nm or less.

An XPS spectrum of the particle having such a composition and such a crystal grain is obtained by X-ray photoelectron spectroscopy, and fitting processing of separating an O1s peak of the XPS spectrum into a plurality of different chemical states is performed. At this time, the O1s peak is separated into at least one first element peak having a peak top binding energy of 532 eV or less and at least one second element peak having a peak top binding energy of more than 532 eV. When a total area of the first element peak is Si and a total area of the second element peak is S2, S2/S1 is 1.5 or more in the soft magnetic powder according to the embodiment.

According to such a configuration, it is possible to obtain a soft magnetic powder from which a green compact having a high insulation resistance value and a high magnetic permeability can be manufactured during compaction.

The soft magnetic powder according to the embodiment will be described in detail below.

1.1. Composition

Iron (Fe) greatly influences basic magnetic properties and mechanical properties of the soft magnetic powder according to the embodiment.

A content proportion x of Fe is 73.0 atomic % or more and 79.5 atomic % or less, preferably 75.0 atomic % or more and 78.5 atomic % or less, and more preferably 75.5 atomic % or more and 78.0 atomic % or less. When the content proportion x of Fe is less than the lower limit value, a saturation magnetic flux density of the soft magnetic powder may decrease. On the other hand, when the content proportion x of Fe exceeds the upper limit value, an amorphous structure cannot be stably formed during manufacturing of the soft magnetic powder, and thus it may be difficult to form the crystal grain having a minute grain size as described above.

Copper (Cu) tends to be separated from Fe when the soft magnetic powder according to the embodiment is manufactured from a raw material. Therefore, since Cu is contained, the composition fluctuates, and a region which is easily crystallized partially is generated in the particle. As a result, precipitation of a Fe phase of a body-centered cubic lattice, which is relatively easily crystallized, is promoted, and the crystal grain having a minute grain size as described above can be easily formed.

A content proportion a of Cu is 0.3 atomic % or more and 2.0 atomic % or less, preferably 0.5 atomic % or more and 1.5 atomic % or less, and more preferably 0.7 atomic % or more and 1.3 atomic % or less. When the content proportion a of Cu is less than the lower limit value, miniaturization of the crystal grain may be impaired, and the crystal grain having a grain size in the above ranges may not be formed. On the other hand, when the content proportion a of Cu exceeds the upper limit value, the mechanical properties of the soft magnetic powder may be deteriorated and may become brittle.

Niobium (Nb), together with Cu, contributes to miniaturization of the crystal grain when a heat treatment is applied to a powder containing a large amount of the amorphous structure. Therefore, it is possible to easily form the crystal grain having a minute grain size as described above.

A content proportion b of Nb is 2.0 atomic % or more and 4.0 atomic % or less, preferably 2.5 atomic % or more and 3.5 atomic % or less, and more preferably 2.7 atomic % or more and 3.3 atomic % or less. When the content proportion b of Nb is less than the lower limit value, miniaturization of the crystal grain may be impaired, and the crystal grain having a grain size in the above ranges may not be formed. On the other hand, when the content proportion b of Nb exceeds the upper limit value, the mechanical properties of the soft magnetic powder may be deteriorated and may become brittle. In addition, a magnetic permeability of the soft magnetic powder may decrease.

Silicon (Si) promotes amorphization when the soft magnetic powder according to the embodiment is manufactured from the raw material. Therefore, when the soft magnetic powder according to the embodiment is manufactured, a homogeneous amorphous structure is once formed, and thereafter, by crystallizing the amorphous structure, the crystal grain having a more uniform grain size is easily formed. Since the uniform grain size contributes to averaging of the magnetocrystalline anisotropy in crystal grains, a coercive force can be reduced, the magnetic permeability can be increased, and the soft magnetism can be improved.

Boron (B) promotes the amorphization when the soft magnetic powder according to the embodiment is manufactured from the raw material. Therefore, when the soft magnetic powder according to the embodiment is manufactured, a homogeneous amorphous structure is once formed, and thereafter, by crystallizing the amorphous structure, the crystal grain having a more uniform grain size is easily formed. Since the uniform grain size contributes to averaging of magnetocrystalline anisotropy in the crystal grains, the coercive force can be reduced, the magnetic permeability can be increased, and the soft magnetism can be improved. $B_y$ using Si and B in combination, the amorphization can be synergistically promoted based on a difference in an atomic radius between Si and B.

Here, when a total content proportion of Si and B is 1 and a proportion of the content proportion of B to the total content proportion of Si and B is y, a proportion of the content proportion of Si to the total content proportion of Si and B is (1−y).

This y is a number satisfying $f(x) \leq y \leq 0.99$. f(x), which is a function of x, is $f(x)=(4\times10^{-34})x^{17.56}$.

FIG. 1 is a diagram showing a region, in a two-axis orthogonal coordinate system in which x is a horizontal axis and y is a vertical axis, in which a range of x and a range of y in the compositional formula of the soft magnetic powder according to the embodiment overlap each other.

In FIG. 1, a region A in which the range of x and the range of y overlap each other is inside a solid line drawn in the orthogonal coordinate system.

Specifically, when (x, y) coordinates satisfying four relationships of x=73.0, x=79.5, y=f(x), and y=0.99 are plotted in the orthogonal coordinate system, the region A is a closed region surrounded by three drawn straight lines and one drawn curve.

y is preferably a number satisfying $f'(x) \leq y \leq 0.97$. f'(x), which is a function of x, is $f'(x)=(4\times10^{-29})x^{14.93}$.

A broken line shown in FIG. 1 indicates a region B in which the above preferable range of x and the above preferable range of y overlap each other.

Specifically, when the (x, y) coordinates satisfying four relationships of x=75.0, x=78.5, y=f'(x), and y=0.97 are plotted in the orthogonal coordinate system, the region B is a closed region surrounded by three drawn straight lines and one drawn curve.

y is more preferably a number satisfying $f''(x) \leq y \leq 0.95$. f''(x), which is a function of x, is $f''(x)=(4\times10^{-29})x^{14.93}+0.05$.

A one-dot chain line shown in FIG. 1 indicates a region C in which the above more preferable range of x and the above more preferable range of y overlap each other.

Specifically, when the (x, y) coordinates satisfying four relationships of x=75.5, x=78.0, y=f''(x), and y=0.95 are plotted in the orthogonal coordinate system, the region C is a closed region surrounded by three drawn straight lines and one drawn curve.

The soft magnetic powder in which x and y are at least in the region A can form, when manufactured, a homogeneous amorphous structure with a high probability. Therefore, by crystallizing the amorphous structure, the crystal grain having a particularly uniform grain size can be formed. Accordingly, a soft magnetic powder having a sufficiently reduced coercive force can be obtained. By using the soft magnetic powder, an iron loss of the dust core can be reduced to be sufficiently low.

The soft magnetic powder in which x and y are at least in the region A can form the uniform crystal grain even when the content proportion of Fe is sufficiently increased. Accordingly, a soft magnetic powder having a sufficiently increased saturation magnetic flux density can be obtained. As a result, it is possible to obtain a dust core having a high saturation magnetic flux density while achieving a sufficiently low iron loss.

When the value of y is smaller than that in the region A, a balance between the content proportion of Si and the content proportion of B is lost, and thus it is difficult to form a homogeneous amorphous structure when the soft magnetic powder is manufactured. Therefore, the crystal grain having a minute grain size cannot be formed, and the coercive force cannot be sufficiently reduced.

On the other hand, when the value of y is larger than that in the region A, the balance between the content proportion of Si and the content proportion of B is lost, and thus it is difficult to form a homogeneous amorphous structure when the soft magnetic powder is manufactured. Therefore, the crystal grain having a minute grain size cannot be formed, and the coercive force cannot be sufficiently reduced.

f(x) is preferably 0.30 or more, more preferably 0.45 or more, and still more preferably 0.55 or more. Accordingly, it is possible to further increase the saturation magnetic flux density of the soft magnetic powder.

In particular, in the region B and the region C, since the value of x is large in the region A, the content proportion of Fe is high. Therefore, it is easy to increase the saturation magnetic flux density of the soft magnetic powder. Therefore, by using the soft magnetic powder in which x and y are contained in at least the region B, it is possible to reduce a size of the dust core or the magnetic element and increase an output of the dust core or the magnetic element.

A total of the content proportion of Si and the content proportion of B, which is (100-x-a-b), is not particularly limited, and is preferably 15.0 atomic % or more and 24.0 atomic % or less, more preferably 16.0 atomic % or more and 23.0 atomic % or less, and still more preferably 16.0 atomic % or more and 22.0 atomic % or less. When (100-x-a-b) is within the above range, the crystal grain having a particularly uniform grain size can be formed in the soft magnetic powder.

Considering the above, y(100-x-a-b) corresponds to the content proportion of B in the soft magnetic powder. y(100-x-a-b) is appropriately set in consideration of the coercive force, the saturation magnetic flux density, or the like as described above, and is preferably $5.0 \leq y(100-x-a-b) \leq 17.0$, more preferably $7.0 \leq y(100-x-a-b) \leq 16.0$, and still more preferably $8.0 \leq y(100-x-a-b) \leq 15.0$.

Accordingly, a soft magnetic powder containing boron (B) at a relatively high concentration can be obtained. Such a soft magnetic powder makes it possible to form, even when the content proportion of Fe is high, a homogeneous amorphous structure during manufacturing of the soft magnetic powder. Therefore, by a subsequent heat treatment, the crystal grain having a minute grain size and a relatively uniform grain size can be formed, and a high magnetic flux density can be achieved while sufficiently reducing the coercive force.

When y(100-x-a-b) is less than the above lower limit value, the content proportion of B becomes small. Therefore, when the soft magnetic powder is manufactured, the amorphization may be difficult depending on the entire composition. On the other hand, when y(100-x-a-b) exceeds the above upper limit value, the content proportion of B increases and the content proportion of Si decreases relatively, and thus the magnetic permeability of the soft magnetic powder may decrease and the saturation magnetic flux density may decrease.

The soft magnetic powder according to the embodiment may contain, in addition to the composition represented by $Fe_xCu_aNb_b(Si_{1-y}B_y)_{100-x-a-b}$, an impurity. Examples of the impurity include all elements other than those described above, and a total content proportion of impurities is preferably 0.50 atomic % or less. Within this range, impurities do not easily reduce the effect of the present disclosure, and are thus allowed to be contained.

A content proportion of each element in the impurities is preferably 0.05 atomic % or less. Within this range, impurities do not easily reduce the effect of the present disclosure, and are thus allowed to be contained.

Although the composition of the soft magnetic powder according to the embodiment is described above, the composition and the impurities are specified by a following analysis method.

Examples of the analysis method include iron and steel-atomic absorption spectrometry defined in JIS G 1257:2000, iron and steel-ICP emission spectrometry defined in JIS G 1258:2007, iron and steel-spark discharge emission spectrometry defined in JIS G 1253:2002, iron and steel-fluorescent X-ray spectrometry defined in JIS G 1256:1997, and gravimetric, titration and absorption spectrometric methods defined in JIS G 1211 to JIS G 1237.

Specific examples thereof include a solid emission spectrometer manufactured by SPECTRO, in particular, a spark discharge emission spectrometer, model: SPECTROLAB, type: LAVMB08A, or ICP apparatus CIROS120 type manufactured by Rigaku Corporation.

In particular, when specifying carbon (C) and sulfur (S), an infrared absorption method after combustion in a current of oxygen (combustion in high frequency induction furnace) defined in JIS G 1211:2011 is also used. Specific examples thereof include a carbon-sulfur analyzer CS-200 manufactured by LECO Corporation.

In particular, when nitrogen (N) and oxygen (O) are specified, methods for determination of nitrogen content for an iron and steel defined in JIS G 1228:1997 and general rules for determination of oxygen in metal materials defined in JIS Z 2613:2006 are also used. Specific examples thereof include an oxygen-nitrogen analyzer TC-300/EF-300 manufactured by LECO Corporation.

1.2. Crystal Grain

The particle of the soft magnetic powder according to the embodiment contains a crystal grain having a crystal grain size of 1.0 nm or more and 30.0 nm or less. Since the crystal grain having such a grain size is minute, the magnetocrystalline anisotropy in crystal grains tends to be averaged. Therefore, the coercive force can be reduced, and in particular, a soft powder can be obtained to be magnetic. In addition, when a certain amount or more of the crystal grain having such a grain size is contained, the magnetic permeability of the soft magnetic powder becomes high. As a result, a soft magnetic powder having a low coercive force and a high magnetic permeability can be obtained. Since the magnetic permeability becomes high, saturation is less likely to occur even under a high current, and thus the saturation magnetic flux density of the soft magnetic powder can be increased.

In the particle, a content proportion of the crystal grain having the above grain size range is not particularly limited, and is preferably 30 vol % or more, more preferably 40 vol % or more and 99 vol % or less, and still more preferably 55 vol % or more and 95 vol % or less. When the content proportion of the crystal grain having the above grain size range is less than the lower limit value, a proportion of the crystal grain having a minute grain size decreases. Therefore, the magnetocrystalline anisotropy is insufficiently averaged, and the magnetic permeability of the soft magnetic powder may decrease or the coercive force of the soft magnetic powder may increase. On the other hand, the content proportion of the crystal grain having the above grain size range may exceed the upper limit value. However, as will be described later, the effect may be insufficient due to the coexistence of the amorphous structure.

The soft magnetic powder according to the embodiment may contain a crystal grain having a grain size outside the range described above, that is, a crystal grain having a grain size of less than 1.0 nm or a grain size of more than 30.0 nm. In this case, the crystal grain having a grain size outside the range is preferably reduced to 10 vol % or less, and more preferably reduced to 5 vol % or less. Accordingly, it is possible to prevent the effect described above from being reduced due to the crystal grain having a grain size outside the range.

The grain size of the crystal grain of the soft magnetic powder is obtained, for example, by a method of observing a cut surface of the particle of the soft magnetic powder by an electron microscope and reading the observation image. In this method, a true circle having the same area as an area of the crystal grain is assumed, and a diameter of the true circle, that is, an equivalent circle diameter can be set as the grain size of the crystal grain.

Since a volume proportion of the crystal grains is considered to be substantially equal to an area proportion occupied by the crystal grains with respect to an area of the cut surface, the area proportion may be regarded as the content proportion.

An average grain size of the crystal grains is preferably 2.0 nm or more and 25.0 nm or less, and more preferably 5.0 nm or more and 20.0 nm or less. Accordingly, the above effect, that is, an effect that the coercive force is low and the magnetic permeability is high becomes more remarkable.

The average grain size of the crystal grains of the soft magnetic powder is obtained by, for example, a method of obtaining the grain sizes of the crystal grains as described above and averaging the grain sizes, and a method of obtaining a width of a peak derived from Fe in a X-ray diffraction pattern of the soft magnetic powder and calculating the average grain size based on the value by a Halder-Wagner method.

The particle of the soft magnetic powder according to the embodiment may further contain an amorphous structure. Since due to the coexistence of the crystal grains having the grain size range and the amorphous structure, magnetostriction of the crystal grains and magnetostriction of the amorphous structure are canceled each other, magnetostriction of the soft magnetic powder can be further reduced. As a result, a soft magnetic powder having a particularly high magnetic permeability is obtained. In addition, a soft magnetic powder whose magnetization is easily controlled is also obtained. Further, by containing the amorphous structure, the grain size of the crystal grains can be more finely and more uniformly maintained.

A content proportion of the amorphous structure in the particle is preferably 5.0 times or less, more preferably 0.02 times or more and 2.0 times or less, and still more preferably 0.10 times or more and less than 1.0 times the content proportion of the crystal grains having the grain size range in terms of a volume proportion. Accordingly, the balance between the crystal grains and the amorphous structure is optimized, and the effect due to the coexistence of the crystal grains and the amorphous structure becomes more remarkable.

1.3. Evaluation for Powder by X-ray Photoelectron Spectroscopy

When the particle of the soft magnetic powder according to the embodiment is subjected to chemical state analysis by the X-ray photoelectron spectroscopy, an XPS spectrum according to a chemical state of an element contained in a particle surface can be obtained. In the soft magnetic powder according to the embodiment, the obtained XPS spectrum includes an O1s peak. Therefore, fitting processing of separating the O1s peak into a plurality of different chemical states is performed. The fitting processing can be performed using analysis software of the XPS spectrum.

1.3.1. Feature (1)

In the soft magnetic powder according to the embodiment, when an XPS spectrum is obtained for a contained particle, the obtained XPS spectrum satisfies the following feature (1).

Specifically, the obtained XPS spectrum includes an O1s peak. The O1s peak is separated into at least one first element peak having a peak top binding energy of 532 eV or less and at least one second element peak having a peak top binding energy of more than 532 eV by the fitting processing. In the feature (1), when a total area of the first element peak is S1 and a total area of the second element peak is S2, S2/S1 is 1.5 or more in the soft magnetic powder according to the embodiment.

Examples of the first element peak include a peak derived from Me-O (oxygen bonded to metal), and a peak derived from Me-OH (hydroxy group bonded to metal). Examples of the second element peak include a peak derived from $SiO_x$ (silicon oxide) and a peak derived from $CO_x$ (carbon oxide). As a result, S2/S1 being within the above range supports that an amount of a silicon oxide or a carbon oxide with respect to an amount of an oxide or a hydroxide of Fe is relatively large. That is, it is presumed that, as compared with a case where S2/S1 is out of the above range, when S2/S1 is within the above range, the amount of the oxide or hydroxide of Fe is reduced and the amount of the simple substance Fe is increased, and the amount of the silicon oxide or carbon oxide is increased. As a result, as compared with a case where S2/S1 is out of the above range, when S2/S1 is within the above range, it is possible to improve magnetic properties caused by the simple substance Fe and to improve insulation caused by the silicon oxide or the like. Therefore, according to the soft magnetic powder of the embodiment, when the soft magnetic powder is compacted, a magnetic element having a high insulation resistance value and a high magnetic permeability can be implemented.

Figure 2:
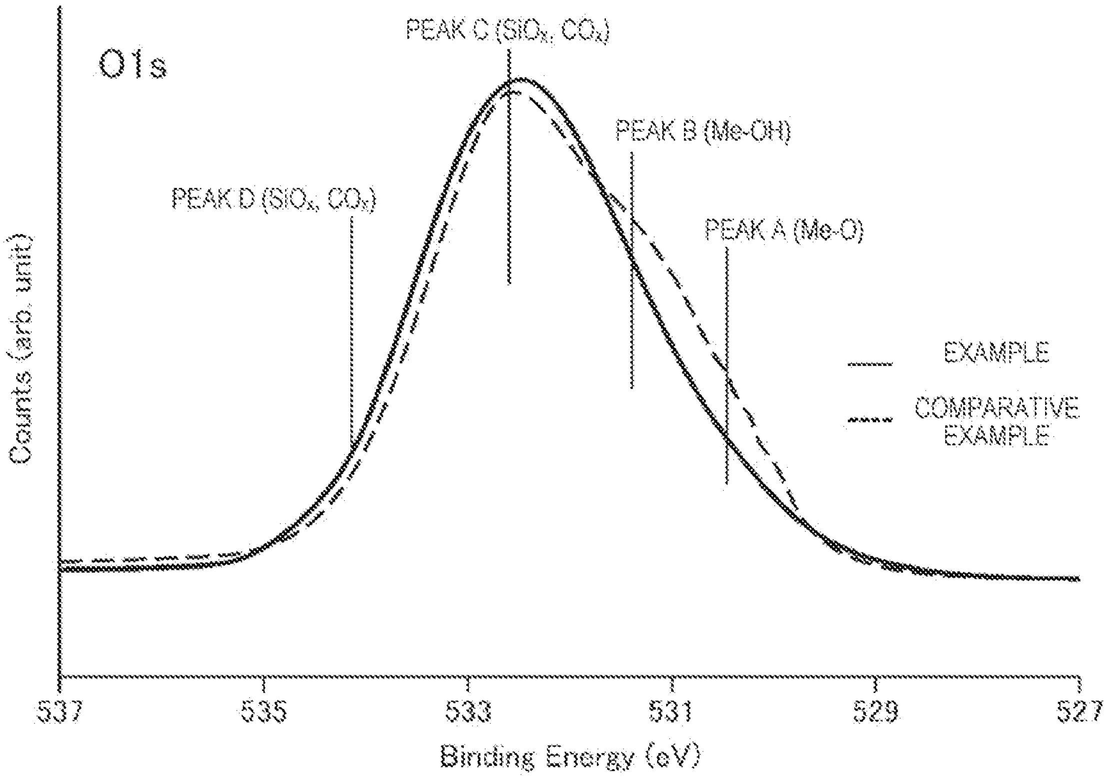
FIG. 2 is an enlarged view of an O1s peak of an XPS spectrum obtained from particles of the soft magnetic powder.

Hereinafter, the XPS spectrum shown in FIG. 2 will be described as an example. FIG. 2 is an enlarged view of an O1s peak of the XPS spectrum obtained from the particles of the soft magnetic powder. In FIG. 2, an O1s peak corresponding to the embodiment (an O1s peak of Example) is indicated by a solid line, and an O1s peak that does not correspond to the embodiment (an O1s peak of Comparative Example) is indicated by a broken line.

As shown in FIG. 2, the O1s peak is a peak located in the vicinity of a binding energy 529 eV to 535 eV. The O1s peak shown in FIG. 2 is separated into peaks belonging to four chemical states as a result of the fitting processing.

Figure 3:
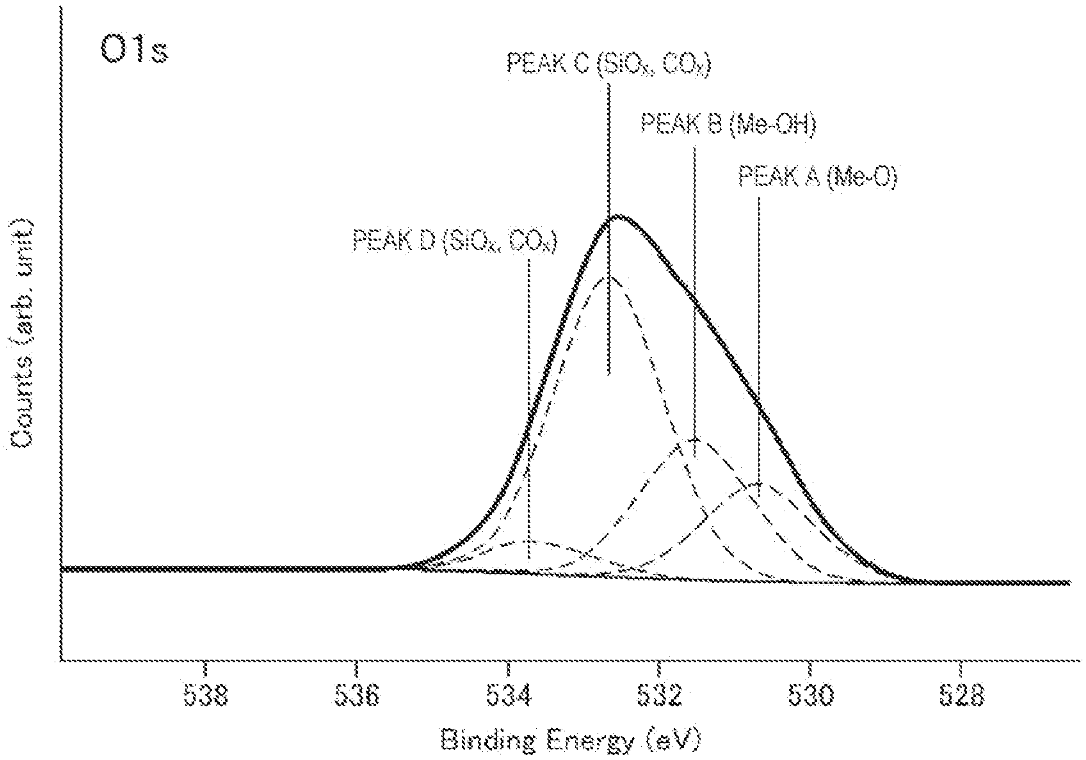
FIG. 3 is a diagram showing four peaks obtained by separating the O1s peak shown in FIG. 2 by fitting processing.

FIG. 3 is a diagram showing the four peaks obtained by separating the O1s peak shown in FIG. 2 by the fitting processing. Here, the peaks belonging to the four chemical states are referred to as a peak A, a peak B, a peak C, and a peak D in order from a low binding energy side.

The peak A and the peak B are peaks in which the peak top binding energy is 532 eV or less, and belong to the above-described first element peak. Therefore, the peak A and the peak B are mainly peaks derived from oxygen or a hydroxy group bonded to a metal, and belong to a substance that causes a decrease in magnetic permeability or the like of the soft magnetic powder.

The peak C and the peak D are peaks in which the peak top binding energy is more than 532 eV, and belong to the above-described second element peak. Therefore, the peak C and the peak D are mainly peaks derived from silicon oxide or carbon oxide, and belong to a substance that improves the insulation between the particles of the soft magnetic powder.

Figure 4:
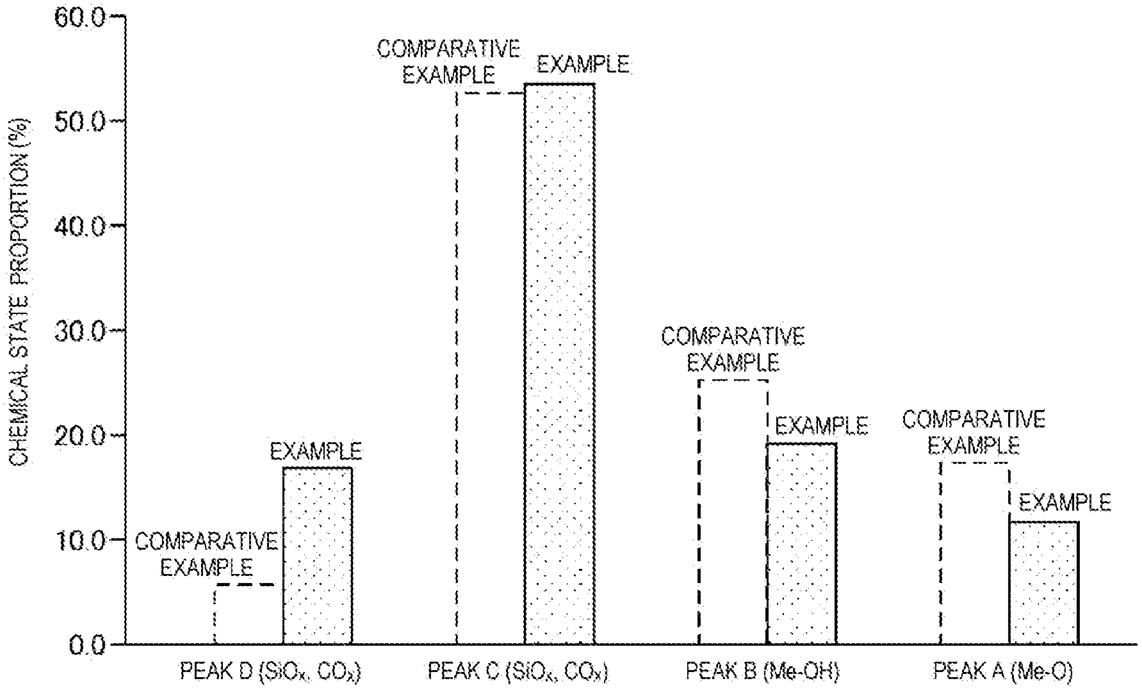
FIG. 4 is a bar graph obtained by measuring areas of the four peaks shown in FIG. 3, calculating proportions with respect to the entire area as chemical state proportions, and comparing the chemical state proportions.

FIG. 4 is a bar graph obtained by measuring areas of the four peaks shown in FIG. 3, calculating proportions with respect to the entire area as chemical state proportions, and comparing the chemical state proportions. In FIG. 4, a result obtained by performing the fitting processing on the O1s peak of Example is indicated by a solid line, and a result obtained by performing the fitting processing on the O1s peak of Comparative Example is indicated by a broken line.

When a total area of the peak A and the peak B is S1, and a total area of the peak C and the peak D is S2, the solid line shown in FIG. 2 satisfies 1.5≤S2/S1, and the broken line shown in FIG. 2 does not satisfy 1.5≤S2/S1.

When S2/S1 is within the above range, from the soft magnetic powder according to the embodiment, it is possible to manufacture a green compact having high magnetic properties caused by the simple substance Fe and having high insulation caused by silicon oxide or the like. Therefore, according to the soft magnetic powder of the embodiment, a green compact having a high insulation resistance value and a high magnetic permeability can be implemented.

S2/S1 is preferably 1.6 or more and 3.5 or less, and more preferably 1.7 or more and 2.8 or less. S2/S1 may exceed the upper limit value, but the soft magnetic powder in which S2/S1 exceeds the upper limit value may be difficult to be stably manufactured and may have a large manufacturing variation.

In the example of FIG. 2, the peak A is a peak derived from Me-O (oxygen bonded to metal), and the peak B is a peak derived from Me-OH (hydroxy group bonded to metal). In the example of FIG. 2, the peak C and the peak D are peaks derived from SiOx (silicon oxide) or $CO_x$ (carbon oxide).

The number of the first element peaks and the number of the second element peaks, which are obtained by separation using the fitting processing, are not particularly limited, and are each preferably 1 or more and 5 or less, and more preferably 1 or more and 3 or less.

1.3.2. Feature (2)

In the soft magnetic powder according to the embodiment, when an XPS spectrum is obtained for a contained particle, the obtained XPS spectrum preferably satisfies the following feature (2).

In the feature (2), the above-described O1s peak includes, as the second element peak, the peak C having a binding energy located in a range of more than 532 eV and less than 533 eV and the peak D having a binding energy located in a range of 533 eV or more and less than 535 eV. In the feature (2), when an area of the peak C is SC and an area of the peak D is SD, SD/SC is 0.15 or more and 0.60 or less.

By satisfying such a feature (2), the soft magnetic powder according to the embodiment contains SiOx (silicon oxide) at a higher concentration. By containing $SiO_x$ at a high concentration, an oxide film containing a large amount of $SiO_x$ is easily formed at a surface layer of the particle. The oxide film can further improve the insulation between particles. When an insulating film is formed at a particle surface, the oxide film serves as a base of the insulating film. Accordingly, adhesion of the insulating film to the particles can be further increased. As a result, it is possible to prevent a decrease in insulation during compaction.

Figure 5:
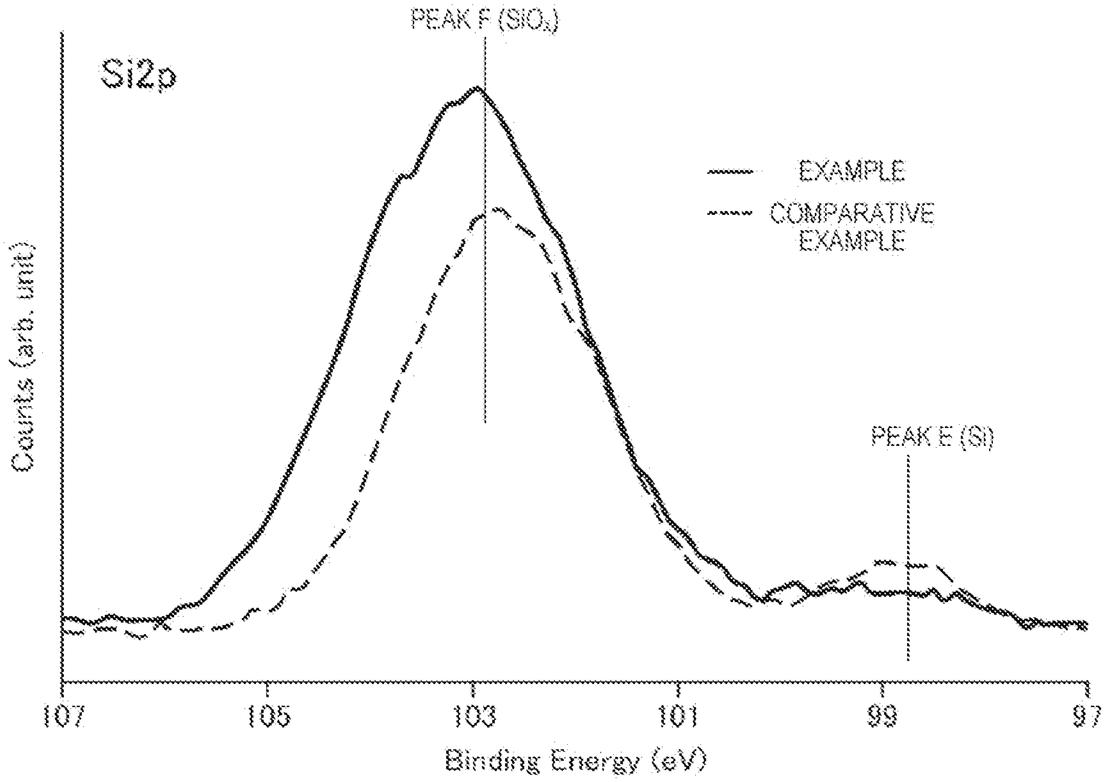
FIG. 5 is an enlarged view of a Si2p peak included in the XPS spectrum obtained from particles of the soft magnetic powder.

FIG. 5 is an enlarged view of a Si2p peak included in the XPS spectrum obtained from the particles of the soft magnetic powder. In FIG. 5, a Si2p peak corresponding to the embodiment (a Si2p peak of Example) is indicated by a solid line, and a Si2p peak that does not correspond to the embodiment (a Si2p peak of Comparative Example) is indicated by a broken line.

As shown in FIG. 5, the Si2p peak is a peak located in the vicinity of a binding energy of 98 eV to 105 eV. The Si2p peak is separated into a peak E belonging to S1 and having a peak top binding energy of 101 eV or less and a peak F belonging to $SiO_x$ and having a peak top binding energy of more than 101 eV.

The solid line shown in FIG. 5 has a waveform in which the peak E is lower and the peak F is higher than that in the broken line shown in FIG. 3. As described above, such a waveform supports that the soft magnetic powder according to the embodiment contains $SiO_x$ at a higher concentration. Since XPS is an analysis method which is particularly sensitive to the particle surface, the result shown in FIG. 5 shows a state of the particle surface, that is, a state of the oxide film described above.

SD/SC is preferably 0.20 or more and 0.50 or less, and more preferably 0.25 or more and 0.40 or less. When SD/SC is less than the lower limit value, the concentration of $SiO_x$ decreases. Therefore, the oxide film formed at the particle surface is thin, and the above effect may not be sufficiently obtained. On the other hand, SD/SC may exceed the upper limit value, but the soft magnetic powder in which SD/SC exceeds the upper limit value may be difficult to be stably manufactured and may have a large manufacturing variation.

1.3.3. Feature (3)

In the soft magnetic powder according to the embodiment, it is preferable that a result of the qualitative quantitative analysis based on the XPS spectrum satisfies the following feature (3).

In the feature (3), when a concentration of S1 in an atomic ratio is represented by R(Si) and a concentration of Fe in an atomic ratio is represented by R(Fe), R(Si)/R(Fe) is 2.5 or more.

By satisfying such a feature (3), the soft magnetic powder according to the embodiment has a low concentration of Fe as an element and has a high concentration of Si as an element in the particle surface. The feature (3) supports that an amount of Fe, that is, an iron oxide contained in the oxide film on the particle surface is small, and an amount of Fe, that is, metal Fe contained inside the oxide film is large. At the same time, the feature (3) supports that an amount of Si, that is, a silicon oxide contained in the oxide film on the particle surface is large. Therefore, when the soft magnetic powder satisfying the feature (3) is compacted, the soft magnetic powder contributes to implementation of the magnetic element having a high insulation resistance value and a high magnetic permeability.

Figures 6, 7:
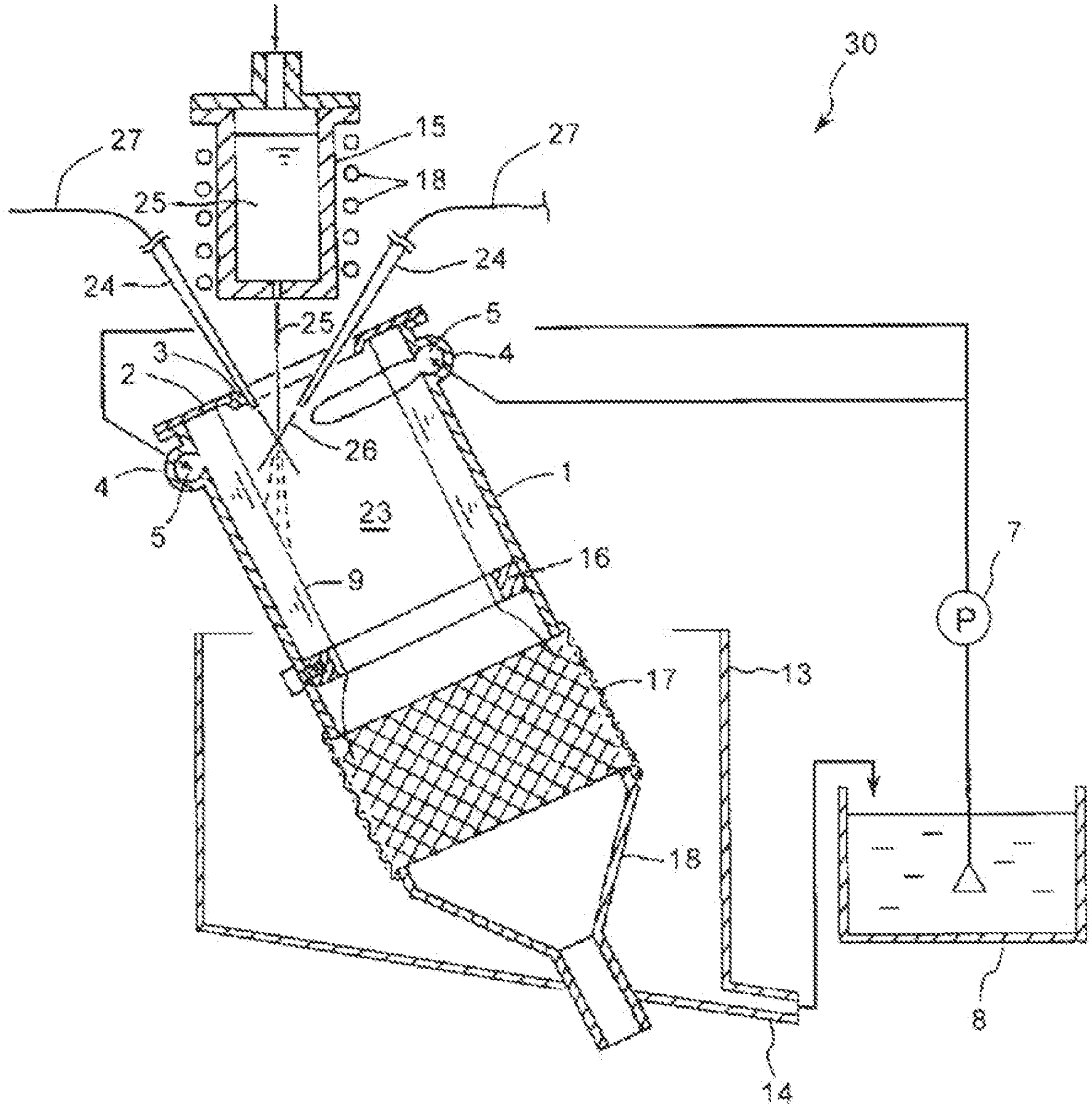
FIG. 6 is a table showing a result of qualitative quantitative analysis (result of qualitative quantitative analysis of Example) and a result of qualitative quantitative analysis of Comparative Example obtained for the soft magnetic powder according to the embodiment.
FIG. 7 is a longitudinal sectional view showing an example of a device for manufacturing the soft magnetic powder by a rotary water atomization method.

FIG. 6 is a table showing a result of qualitative quantitative analysis (result of qualitative quantitative analysis of Example) and a result of qualitative quantitative analysis of Comparative Example obtained for the soft magnetic powder according to the embodiment. A numerical value shown in FIG. 6 represents a concentration in an atomic ratio, and the unit is atomic %.

As shown in FIG. 6, in Example, R(Si)/R(Fe) is 2.5 or more. In contrast, in Comparative Example, R(Si)/R(Fe) is less than 2.5.

R(Si)/R(Fe) is preferably 5.0 or more and 20.0 or less, and more preferably 7.0 or more and 15.0 or less. When R(Si)/R(Fe) is less than the lower limit value, the oxide film formed at the particle surface is thin, and the above effect may not be sufficiently obtained. On the other hand, R(Si)/R(Fe) may exceed the upper limit value, but the soft magnetic powder in which R(Si)/R(Fe) exceeds the upper limit value may be difficult to be stably manufactured and may have a large manufacturing variation.

1.3.4. Analysis by X-ray Photoelectron Spectroscopy

The analysis by the X-ray photoelectron spectroscopy can be performed under the following conditions.

X-ray photoelectron spectrometer: ESCALAB 250 manufactured by Thermo Fisher Scientific X-ray source: AlKα ray X-ray incident angle with respect to sample: 45°

1.4. Various Properties

In the soft magnetic powder according to the embodiment, Vickers hardness of the particle is preferably 1000 or more and 3000 or less, and more preferably 1200 or more and 2500 or less. When the soft magnetic powder containing the particle having such hardness is compression-molded to form a dust core, deformation at a contact point between the particles is reduced to a minimum. Therefore, a contact area between the particles in the dust core is reduced to be small, and insulation between the particles can be increased.

When the Vickers hardness is less than the above lower limit value, depending on an average grain size of the soft magnetic powder, when the soft magnetic powder is compression-molded, the particles may be easily crushed at the contact point between the particles. Accordingly, the contact area between the particles in the dust core increases, and the insulation between the particles may decrease. On the other hand, when the Vickers hardness exceeds the above upper limit value, depending on the average grain size of the soft magnetic powder, powder moldability decreases, and a density during forming of the dust core decreases, and thus a saturation magnetic flux density of the magnetic element may decrease.

The Vickers hardness of the particle of the soft magnetic powder is measured by a micro Vickers hardness tester at a central portion of a cross section of the particle. The central portion of the cross section of the particle is a position corresponding to, when the particle is cut, a midpoint of a long axis on a cut surface of the particle. An indentation load of an indenter during the test is 1.96 N.

An average grain size D50 of the soft magnetic powder according to the embodiment is not particularly limited, and is preferably 1 μm or more and 50 μm or less, more preferably 10 μm or more and 45 μm or less, and still more preferably 20 μm or more and 40 μm or less. By using the soft magnetic powder having such an average grain size, it is possible to shorten a path through which an eddy current flows, and thus it is possible to manufacture a magnetic element capable of sufficiently reducing an eddy current loss occurred in the particles of the soft magnetic powder.

When the average grain size of the soft magnetic powder is particularly 10 μm or more, by mixing the soft magnetic powder with a soft magnetic powder having an average grain size smaller than that of the soft magnetic powder, it is possible to prepare a mixed powder from which a high powder compacting density can be implemented. This mixed powder is also an embodiment of the soft magnetic powder according to the present disclosure. According to such a mixed powder, a filling density of the dust core can be increased, and the saturation magnetic flux density and the magnetic permeability of the magnetic element can be increased.

In volume-based grain size distribution obtained by a laser diffraction method, the average grain size D50 of the soft magnetic powder is obtained as a grain size whose accumulation is 50% from a small diameter side.

When the average grain size of the soft magnetic powder is less than the above lower limit value, the soft magnetic powder is too fine, and thus filling properties of the soft magnetic powder may easily decrease. Accordingly, a molding density of the dust core is reduced, and thus the saturation magnetic flux density and the magnetic permeability of the dust core may decrease depending on a composition and mechanical properties of the soft magnetic powder. On the other hand, when the average grain size of the soft magnetic powder exceeds the above upper limit value, depending on the composition and the mechanical properties of the soft magnetic powder, the eddy current loss occurred in the particles cannot be sufficiently reduced, and the iron loss of the magnetic element may increase.

With respect to the soft magnetic powder according to the embodiment, in the volume-based grain size distribution obtained by the laser diffraction method, when a grain size whose accumulation is 10% from the small diameter side is defined as D10, and a grain size whose accumulation is 90% from the small diameter side is defined as D90, (D90-D10)/D50 is preferably about 1.0 or more and 2.5 or less, and more preferably about 1.2 or more and 2.3 or less. (D90-D10)/D50 is an index indicating a degree of expansion of the grain size distribution, and when the index is within the above range, the filling properties of the soft magnetic powder are good. Therefore, a magnetic element having particularly high magnetic properties such as the magnetic permeability and the saturation magnetic flux density can be obtained.

The coercive force of the soft magnetic powder according to the embodiment is not particularly limited, and is preferably less than 2.0 [Oe] (less than 160 [A/m]), and more preferably 0.1 [Oe] or more and 1.5 [Oe] or less (39.9 [A/m] or more and 120 [A/m] or less). By using the soft magnetic powder having such a small coercive force, it is possible to manufacture a magnetic element capable of sufficiently reducing a hysteresis loss even under a high frequency.

The coercive force of the soft magnetic powder can be measured, for example, by a vibrating sample magnetometer such as TM-VSM1230-MHHL manufactured by Tamakawa Co., Ltd.

When the soft magnetic powder according to the embodiment is formed as a green compact, the magnetic permeability thereof is preferably 15 or more and more preferably 18 or more and 50 or less at a measurement frequency of 100 MHz. Such a soft magnetic powder contributes to the implementation of the magnetic element having excellent magnetic properties such as a saturation magnetic flux density.

The magnetic permeability of the green compact is, for example, an effective magnetic permeability obtained based on a self-inductance of a closed magnetic core coil in which the green compact has a toroidal shape. For the measurement of the magnetic permeability, for example, an impedance analyzer such as 4194A manufactured by Agilent Technologies, Inc. is used, and the measurement frequency is set to 100 MHz. A winding number of a winding is 7 times, and a wire diameter of the winding is 0.6 mm.

The saturation magnetic flux density of the soft magnetic powder according to the embodiment is preferably 1.00 [T] or more, and more preferably 1.10 [T] or more.

The saturation magnetic flux density of the soft magnetic powder is measured, for example, by the following method.

First, a true specific gravity p of the soft magnetic powder is measured by a full-automatic gas substitution type densitometer AccuPyc 1330 manufactured by Micromeritics Corporation. Next, a maximum magnetization Mm of the soft magnetic powder is measured by a vibrating sample magnetometer, VSM system, TM-VSM1230-MHHL manufactured by Tamakawa Co., Ltd. Then, a saturation magnetic flux density Bs is calculated by the following equation.

$$Bs=4\pi/10000\times\rho\times Mm.$$

The soft magnetic powder according to the embodiment is a columnar green compact having an inner diameter of 8 mm and a mass of 0.7 g. When the green compact is compressed in an axial direction under a load of 20 kgf, a resistance value of the green compact in the axial direction is preferably 0.3 kΩ or more, and more preferably 1.0 kΩ or more. In the soft magnetic powder from which a green compact having such a resistance value can be implemented, insulation between the particles is sufficiently secured. Therefore, such a soft magnetic powder contributes to implementation of a magnetic element capable of reducing an eddy current loss.

An upper limit value of the resistance value is not particularly limited, and is preferably 30.0 kΩ or less, and more preferably 9.0 kΩ or less in consideration of a reduction in variation or the like.

In the soft magnetic powder according to the embodiment, it is not necessary that all particles have the above configuration, and the soft magnetic powder may contain particles not having the above configuration, and it is preferable that 95 mass % or more of the particles have the above configuration.

The soft magnetic powder according to the embodiment may be mixed with another soft magnetic powder or a non-soft magnetic powder, and may be used as a mixed powder for manufacturing a dust core or the like.

1.5. Effects of Embodiment

As described above, the soft magnetic powder according to the embodiment contains a particle having a composition represented by $Fe_xCu_aNb_b(Si_{1-y}B_y)_{100-x-a-b}$, a, b, and x being numbers whose units are atomic %, in which 0.3≤a≤2.0, 2.0≤b≤4.0, and 73.0≤x≤79.5, and y being a number satisfying f(x)≤y≤0.99, and $f(x)=(4\times10^{-34})x^{17.56}$. The particle contains a crystal grain having a grain size of 1.0 nm or more and 30.0 nm or less.

An XPS spectrum of the particle is obtained by X-ray photoelectron spectroscopy and fitting processing of separating an O1s peak of the XPS spectrum into a plurality of different chemical states is performed. As a result, the O1s peak is separated into at least one first element peak having a peak top binding energy of 532 eV or less and at least one second element peak having a peak top binding energy of more than 532 eV. When a total area of the first element peak is S1 and a total area of the second element peak is S2, S2/S1 is 1.5 or more.

It is presumed that, as compared with the case where S2/S1 is out of the above range, when S2/S1 is within the above range, the amount of the oxide or hydroxide of Fe is reduced and the amount of the simple substance Fe is increased, and the amount of the silicon oxide or carbon oxide is increased. As a result, as compared with the case where S2/S1 is out of the above range, when S2/S1 is within the above range, it is possible to improve magnetic properties caused by the simple substance Fe and to improve insulation caused by the silicon oxide or the like. Therefore, according to the soft magnetic powder of the embodiment, when the soft magnetic powder is compacted, a magnetic element having a high insulation resistance value and a high magnetic permeability can be implemented.

In the soft magnetic powder according to the embodiment, when qualitative quantitative analysis of the particle is performed based on the XPS spectrum, a concentration of S1 in an atomic ratio is represented by R(Si), and a concentration of Fe in an atomic ratio is represented by R(Fe), R(Si)/R(Fe) is preferably 2.5 or more.

Such a soft magnetic powder has a low concentration of Fe as an element and has a high concentration of S1 as an element in a particle surface. By satisfying the above range, the soft magnetic powder satisfying that the amount of metal Fe is large inside an oxide film and that the amount of silicon oxide contained in the oxide film is large can be obtained.

When the soft magnetic powder is compacted, a magnetic element having a high insulation resistance value and a high magnetic permeability can be obtained.

In the soft magnetic powder according to the embodiment, a content proportion of the crystal grain having a crystal grain size of 1.0 nm or more and 30.0 nm or less in the particle is preferably 30 vol % or more. Accordingly, a proportion of the crystal grain having a minute grain size is sufficiently high, and thus the magnetocrystalline anisotropy is sufficiently averaged, the magnetic permeability of the soft magnetic powder is increased, and the coercive force of the soft magnetic powder can be sufficiently reduced.

The soft magnetic powder according to the embodiment preferably has an average grain size of 1 μm or more and 50 μm or less. By using the soft magnetic powder having such an average grain size, it is possible to shorten a path through which an eddy current flows, and thus it is possible to manufacture a magnetic element capable of sufficiently reducing an eddy current loss occurred in the particles of the soft magnetic powder.

2. Method of Manufacturing Soft Magnetic Powder

Next, a method of manufacturing the soft magnetic powder according to the embodiment will be described.

The soft magnetic powder may be manufactured by any manufacturing method, and is manufactured by, for example, an atomization method such as a water atomization method, a gas atomization method, or a rotary water atomization method, or various powdering methods such as a reduction method, a carbonyl method, or a pulverization method.

Examples of the atomization method include, depending on a type of a cooling medium or a device configuration, a water atomization method, a gas atomization method, and a rotary water atomization method. Among these methods, the soft magnetic powder is preferably manufactured by an atomization method, more preferably manufactured by a water atomization method or a rotary water atomization method, and still more preferably manufactured by a rotary water atomization method. The atomization method is a method of manufacturing a powder by causing a molten metal to collide with a fluid such as a liquid or a gas injected at a high speed so as to pulverize and cool the molten metal. By using such an atomization method, a large cooling rate can be obtained, and thus amorphization can be promoted. As a result, crystal grains having a more uniform grain size can be formed by a heat treatment.

The "water atomization method" in the present specification refers to a method in which a liquid such as water or oil is used as a coolant, and in a state where the liquid is injected in an inverted conical shape which converges on one point, the molten metal is caused to flow downward a convergence point and to collide with the convergence point, so that the molten metal is pulverized to manufacture a metal powder.

According to the rotary water atomization method, since the molten metal can be cooled at an extremely high speed, solidification can be achieved with a high degree of disordered atomic arrangement maintained in the molten metal. Therefore, by performing a crystallization treatment thereafter, it is possible to efficiently manufacture a soft magnetic powder containing crystal grains having a uniform grain size.

Hereinafter, the method of manufacturing the soft magnetic powder by the rotary water atomization method will be further described.

In the rotary water atomization method, a coolant is injected and supplied along an inner circumferential surface of a cooling tubular body and swirled along the inner circumferential surface of the cooling tubular body to form a coolant layer at the inner circumferential surface. On the other hand, a raw material of the soft magnetic powder is melted, and a liquid or gas jet is sprayed to the obtained molten metal while the molten metal naturally drops. Accordingly, the molten metal is scattered, and the scattered molten metal is taken into the coolant layer. As a result, the scattered and pulverized molten metal is rapidly cooled and solidified to obtain a soft magnetic powder.

FIG. 7 is a longitudinal sectional view showing an example of a device for manufacturing the soft magnetic powder by the rotary water atomization method.

A powder manufacturing device 30 shown in FIG. 7 includes a cooling tubular body 1, a crucible 15, a pump 7, and a jet nozzle 24. The cooling tubular body 1 is a tubular body for forming a coolant layer 9 at an inner circumferential surface of the cooling tubular body 1. The crucible 15 is a supply container for causing a molten metal 25 to flow down and for supplying the molten metal 25 to a space portion 23 inside the coolant layer 9. The pump 7 supplies a coolant to the cooling tubular body 1. The jet nozzle 24 injects a gas jet 26 for dividing the flowing down molten metal 25 in the form of a minute flow into liquid droplets. The molten metal 25 is prepared according to the composition of the soft magnetic powder.

The cooling tubular body 1 has a cylindrical shape, and is provided such that a tubular body axis line extends along a vertical direction or is inclined at an angle of 30° or less with respect to the vertical direction.

An upper end opening of the cooling tubular body 1 is closed by a lid body 2. An opening portion 3 for supplying the molten metal 25 flowing down to the space portion 23 of the cooling tubular body 1 is formed in the lid body 2.

A coolant injecting pipe 4 for injecting the coolant to the inner circumferential surface of the cooling tubular body 1 is provided in an upper portion of the cooling tubular body 1. A plurality of discharge ports 5 of the coolant injecting pipe 4 are provided at equal intervals along a circumferential direction of the cooling tubular body 1.

The coolant injecting pipe 4 is coupled to a tank 8 via pipes to which the pump 7 is coupled, and the coolant in the tank 8 sucked up by the pump 7 is injected and supplied via the coolant injecting pipe 4 into the cooling tubular body 1. Accordingly, the coolant gradually flows down while rotating along the inner circumferential surface of the cooling tubular body 1, and accordingly, the coolant layer 9 along the inner circumferential surface is formed. A cooler may be interposed as necessary in the tank 8 or in a middle of a circulation flow path. As the coolant, in addition to water, oil such as silicone oil is used, and various additives may be further added. By removing dissolved oxygen in the coolant in advance, it is possible to prevent oxidation associated with cooling of the manufactured powder.

A layer thickness adjusting ring 16 for adjusting a layer thickness of the coolant layer 9 is detachably provided at a lower portion of the inner circumferential surface of the cooling tubular body 1. By providing the layer thickness adjusting ring 16, a downflow rate of the coolant is reduced, the layer thickness of the coolant layer 9 can be secured, and the layer thickness can be made uniform.

Further, a cylindrical liquid draining mesh body 17 is continuously provided at a lower portion of the cooling tubular body 1, and a funnel-shaped powder recovery container 18 is provided below the liquid draining mesh body 17. A coolant recovery cover 13 is provided around the liquid draining mesh body 17 so as to cover the liquid draining mesh body 17, and a drain port 14 formed in a bottom portion of the coolant recovery cover 13 is coupled via a pipe to the tank 8.

The jet nozzle 24 is provided in the space portion 23. The jet nozzle 24 is attached to a tip end of a gas supply pipe 27 which is inserted through the opening portion 3 of the lid body 2 into the cooling tubular body 1, and an injection port of the jet nozzle 24 is directed to the molten metal 25 in the form of a minute flow.

In order to manufacture a soft magnetic powder in such a powder manufacturing device 30, first, the pump 7 is operated to form the coolant layer 9 at the inner circumferential surface of the cooling tubular body 1. Next, the molten metal 25 in the crucible 15 is caused to flow down into the space portion 23. When the gas jet 26 is sprayed to the molten metal 25 flowing down, the molten metal 25 is scattered, and the pulverized molten metal 25 is caught in the coolant layer 9. As a result, the pulverized molten metal 25 is cooled and solidified to obtain a soft magnetic powder.

In the rotary water atomization method, a coolant is continuously supplied to stably maintain an extremely high cooling rate, so that an amorphous state of the manufactured soft magnetic powder before a heat treatment is stabilized. As a result, it is possible to efficiently manufacture, by performing the heat treatment thereafter, a soft magnetic powder containing crystal grains having a uniform grain size.

Since the molten metal 25 miniaturized to a certain size by the gas jet 26 falls down by inertia until the molten metal 25 is caught in the coolant layer 9, liquid droplets are made spherical at this time. As a result, a soft magnetic powder can be manufactured.

For example, a downflow amount of the molten metal 25 flowing down from the crucible 15 varies depending on a size of the device and is not particularly limited, and is preferably reduced to 1 kg or less per minute. Accordingly, when the molten metal 25 is scattered, the molten metal 25 is scattered as liquid droplets having an appropriate size, and thus a soft magnetic powder having the average grain size as described above can be obtained. Since an amount of the molten metal 25 supplied for a certain period of time is reduced to some extent, a sufficient cooling rate can also be obtained. For example, by reducing the downflow amount of the molten metal 25 within the above range, it is possible to make adjustments such as reducing the average grain size of the soft magnetic powder.

On the other hand, an outer diameter of the minute flow of the molten metal 25 flowing down from the crucible 15, that is, an inner diameter of a downflow port of the crucible 15 is not particularly limited, and is preferably 1 mm or less. Accordingly, the gas jet 26 can easily and uniformly hit the minute flow of the molten metal 25, and thus liquid droplets having an appropriate size are likely to uniformly scatter. As a result, a soft magnetic powder having the average grain size as described above can be obtained. Since the amount of the molten metal 25 supplied for a certain period of time is reduced, the cooling rate is also sufficiently obtained.

A flow rate of the gas jet 26 is not particularly limited, and is preferably set to 100 m/s or more and 1000 m/s or less. Accordingly, the molten metal 25 can also be scattered as liquid droplets having an appropriate size, and thus a soft magnetic powder having the average grain size as described above can be obtained. Since the gas jet 26 has a sufficient flow rate, a sufficient flow rate is applied to the scattered liquid droplets, the liquid droplets become finer, and a time required for the liquid droplets to be caught in the coolant layer 9 is shortened. As a result, the liquid droplets can be made spherical in a short time, and are cooled in a short time. For example, the average grain size of the soft magnetic powder can be adjusted to be small by increasing the flow rate of the gas jet 26 within the above range.

As other conditions, for example, it is preferable that a pressure at the time of injecting the coolant supplied to the cooling tubular body 1 is set to about 5 MPa or more and 200 MPa or less, and that a liquid temperature at the time of injecting the coolant supplied to the cooling tubular body 1 is set to about −10° C. or higher and 40° C. or lower. Accordingly, a flow rate of the coolant layer 9 can be optimized, and the pulverized molten metal 25 can be appropriately and uniformly cooled.

A temperature of the molten metal 25 is preferably set to, with respect to a melting point Tm of the soft magnetic powder to be manufactured, about Tm+20° C. or higher and Tm+200° C. or lower, and more preferably set to about Tm+50° C. or higher and Tm+150° C. or lower. Accordingly, when the molten metal 25 is pulverized by the gas jet 26, variations in properties among particles can be reduced to be particularly small, and the amorphization of the manufactured soft magnetic powder before a heat treatment can be more reliably achieved.

The gas jet 26 may be replaced with a liquid jet as necessary.

The cooling rate during cooling of the molten metal 25 in an atomization method is preferably $1\times10^{4}$° C./s or more, more preferably $1\times10^{5}$° C./s or more, and still more preferably $1\times10^{6}$° C./s or more. By such rapid cooling, particularly stable amorphization can be achieved, and finally, a soft magnetic powder containing crystal grains having a uniform grain size can be obtained. It is possible to reduce a variation in composition proportion among the particles of the soft magnetic powder.

The soft magnetic powder manufactured as described above is subjected to a crystallization treatment. Accordingly, at least a part of the amorphous structure is crystallized to form crystal grains.

The crystallization treatment can be performed by subjecting a soft magnetic powder having an amorphous structure to a heat treatment. A temperature in the heat treatment is not particularly limited, and is preferably 520° C. or higher and 640° C. or lower, more preferably 530° C. or higher and 630° C. or lower, and still more preferably 540° C. or higher and 620° C. or lower. A time in the heat treatment, which is a time for maintaining the above temperature, is preferably 1 minute or longer and 180 minutes or shorter, more preferably 3 minutes or longer and 120 minutes or shorter, and still more preferably 5 minutes or longer and 60 minutes or shorter. By setting the temperature and the time in the heat treatment to be within the above ranges, crystal grains having a more uniform grain size can be generated.

When the temperature or the time in the heat treatment is less than the above lower limit value, depending on the composition or the like of the soft magnetic powder, the crystallization may be insufficient and the uniformity of the grain sizes may be deteriorated. On the other hand, when the temperature or the time in the heat treatment exceeds the above upper limit value, depending on the composition or the like of the soft magnetic powder, the crystallization may excessively proceed and the uniformity of the grain sizes may be deteriorated.

A temperature raising rate and a temperature drop rate in the crystallization treatment influence the grain sizes and the uniformity of the grain size of the crystal grains generated by the heat treatment, reactions such as formation of the oxide film formed at the particle surface and reduction of a metal oxide, or the like.

The temperature raising rate is preferably 10° C./min or more and 35° C./min or less, more preferably 10° C./min or more and 30° C./min or less, and still more preferably 15° C./min or more and 25° C./min or less. By setting the temperature raising rate to be within the above range, the grain sizes of the crystal grains, a distribution and grain sizes of Cu segregation portions, and a Cu concentration can be made to fall within the above ranges. When the temperature raising rate is lower than the lower limit value, accordingly, a time required for exposure to a high temperature becomes longer, so that the grain sizes of the crystal grains may become too large. When the temperature raising rate exceeds the upper limit value, the grain sizes of the crystal grains may become too small, the distribution of the Cu segregation portions may become too shallow, the grain sizes of the Cu segregation portions may become too small, or the Cu concentration may become too low.

The temperature drop rate is preferably 40° C./min or more and 80° C./min or less, more preferably 50° C./min or more and 70° C./min or less, and still more preferably 55° C./min or more and 65° C./min or less. By setting the temperature drop rate to be within the above range, the grain sizes of the crystal grains, the distribution and the grain sizes of the Cu segregation portions, and the Cu concentration can be made to fall within the above ranges. When the temperature drop rate is lower than the lower limit value, accordingly, a time required for exposure to a high temperature becomes longer, so that the grain sizes of the crystal grains may become too large. When the temperature drop rate exceeds the upper limit value, the grain sizes of the crystal grains may become too small, the distribution of the Cu segregation portions may become too shallow, the grain sizes of the Cu segregation portions may become too small, or the Cu concentration may become too low.

An atmosphere in the crystallization treatment is not particularly limited, and is preferably an inert gas atmosphere such as nitrogen or argon, a reducing gas atmosphere such as hydrogen or ammonia decomposition gas, or a reduced-pressure atmosphere thereof. Accordingly, it is possible to crystallize the soft magnetic powder while preventing oxidation of the metal, and it is possible to obtain a soft magnetic powder having excellent magnetic properties.

An oxygen concentration in the atmosphere of the crystallization treatment influences reactions such as formation of the oxide film formed at the particle surface and reduction of a metal oxide. These reactions are also influenced by the temperature raising rate and the temperature drop rate of the crystallization treatment. Therefore, in order to manufacture the soft magnetic powder according to the embodiment described above, the crystallization treatment is performed at the temperature raising rate and the temperature drop rate described above, and the oxygen concentration in the atmosphere of the crystallization treatment is preferably 1000 ppm or less, more preferably 5 ppm or more and 500 ppm or less, and still more preferably 10 ppm or more and 200 ppm or less in terms of a volume proportion. Accordingly, oxides or hydroxides of Fe are likely to be reduced, and S1 is oxidized and $SiO_x$ is easily formed. As a result, the soft magnetic powder according to the embodiment can be efficiently manufactured. In consideration of the above reactions, the atmosphere of the crystallization treatment is preferably an inert gas atmosphere, and a pressure of the atmosphere is preferably an atmospheric pressure (50 kPa or more and 150 kPa or less).

As described above, the soft magnetic powder according to the embodiment can be manufactured.

The soft magnetic powder thus obtained may be classified as necessary. Examples of a classification method include dry classification such as sieving classification, inertial classification, centrifugal classification, and wind classification, and wet classification such as sedimentation classification.

An insulating film may be formed at each particle surface of the obtained soft magnetic powder as necessary. Examples of a constituent material of the insulating film include inorganic materials such as phosphates such as magnesium phosphate, calcium phosphate, zinc phosphate, manganese phosphate, and cadmium phosphate, and silicates such as sodium silicate, ceramic materials such as silica, alumina, magnesia, zirconia, and titania, and glass materials such as borosilicate glass and silica glass.

3. Dust Core and Magnetic Element

Next, a dust core and a magnetic element according to the embodiment will be described.

The magnetic element according to the embodiment can be applied to various magnetic elements including a magnetic core, such as a choke coil, an inductor, a noise filter, a reactor, a transformer, a motor, an actuator, an electromagnetic valve, and a generator. The dust core according to the embodiment can be applied to a magnetic core included in these magnetic elements.

Hereinafter, two types of coil components will be representatively described as an example of the magnetic element.

3.1. Toroidal Type

First, a toroidal type coil component, which is an example of the magnetic element according to the embodiment, will be described.

Figure 8:
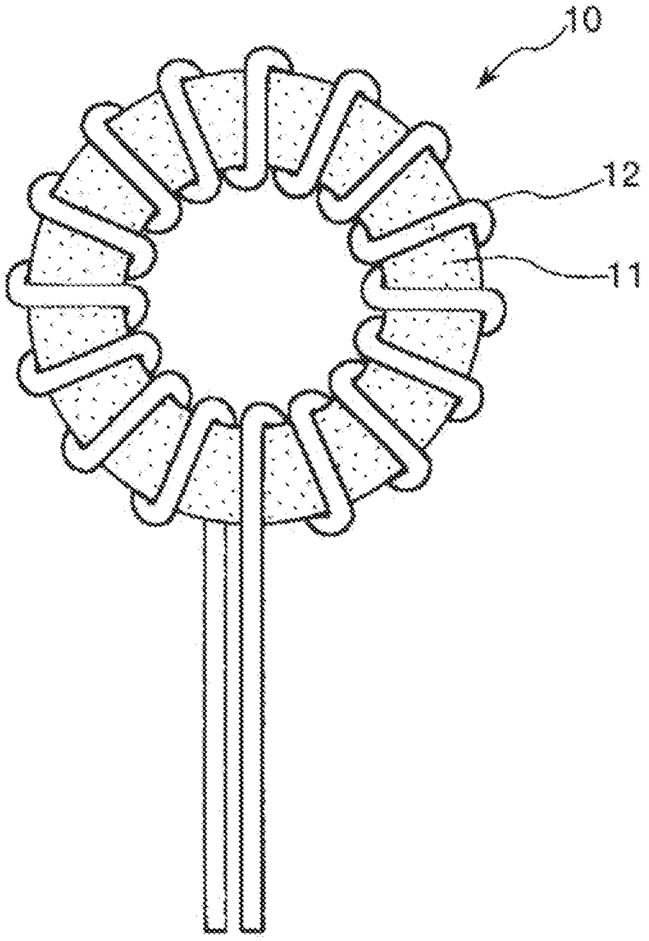
FIG. 8 is a plan view schematically showing a toroidal type coil component.

FIG. 8 is a plan view schematically showing the toroidal type coil component.

A coil component 10 shown in FIG. 8 includes a ring-shaped dust core 11 and a conductive wire 12 wound around the dust core 11. Such a coil component 10 is generally referred to as a toroidal coil.

The dust core 11 is obtained by mixing the soft magnetic powder according to the embodiment and a binder, supplying the obtained mixture to a mold, and pressing and molding the mixture. That is, the dust core 11 is a green compact containing the soft magnetic powder according to the embodiment. Such a dust core 11 has high insulation and a high magnetic permeability. As a result, when the dust core 11 is mounted on an electronic device or the like, power consumption of the electronic device or the like can be reduced and high performance can be achieved, thereby contributing to improvement in reliability of the electronic device or the like.

The binder may be added as necessary, and may be omitted.

The coil component 10 as a magnetic element including such a dust core 11 has a low iron loss and a high magnetic permeability.

Examples of a constituent material of the binder used for preparing the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate. In particular, the constituent material of the binder is preferably a thermosetting polyimide or an epoxy-based resin. The resin materials are easily cured by being heated and have excellent heat resistance. Therefore, ease of manufacturing the dust core 11 and heat resistance thereof can be improved.

A proportion of the binder with respect to the soft magnetic powder slightly varies depending on a target saturation magnetic flux density and mechanical properties of the dust core 11 to be prepared, an acceptable eddy current loss, or the like, and is preferably about 0.5 mass % or more and 5 mass % or less, and more preferably about 1 mass % or more and 3 mass % or less. Accordingly, it is possible to obtain the dust core 11 having excellent magnetic properties such as the saturation magnetic flux density and the magnetic permeability while sufficiently binding the particles of the soft magnetic powder to each other.

Various additives may be added to the mixture as necessary for any purpose.

Examples of a constituent material of the conductive wire 12 include a material having high conductivity, for example, a metal material including Cu, Al, Ag, Au, and Ni. An insulating film is provided on a surface of the conductive wire 12 as necessary.

A shape of the dust core 11 is not limited to the ring shape shown in FIG. 8, and may be, for example, a shape in which a part of the ring is missing, or a shape in which a shape in a longitudinal direction is linear.

The dust core 11 may contain, as necessary, a soft magnetic powder other than the soft magnetic powder according to the embodiment described above, or a non-magnetic powder.

3.2. Closed Magnetic Circuit Type

Next, a closed magnetic circuit type coil component, which is an example of the magnetic element according to the embodiment, will be described.

Figure 9:
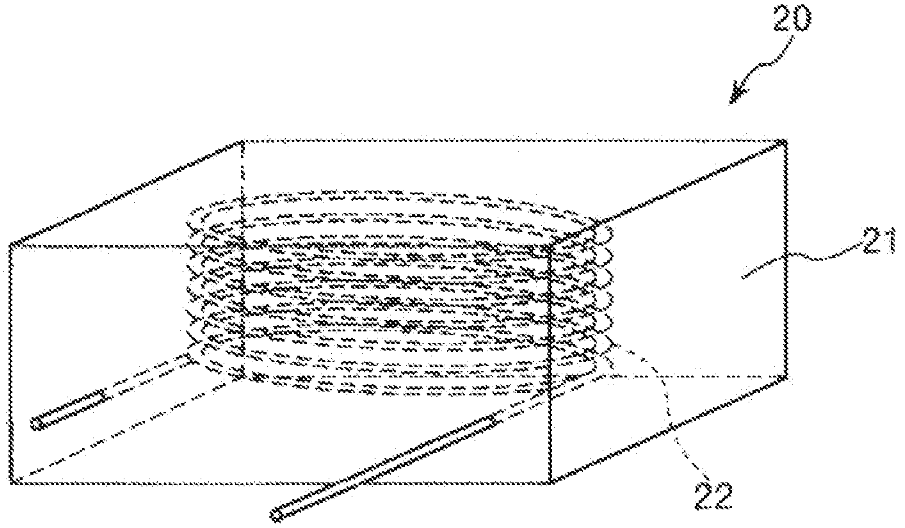
FIG. 9 is a transparent perspective view schematically showing a closed magnetic circuit type coil component.

FIG. 9 is a transparent perspective view schematically showing the closed magnetic circuit type coil component.

Hereinafter, the closed magnetic circuit type coil component will be described. In the following description, differences from the toroidal type coil component will be mainly described, and description of similar matters is omitted.

As shown in FIG. 9, a coil component 20 according to the embodiment is formed by embedding a conductive wire 22 formed in a coil shape in a dust core 21. That is, the coil component 20 is formed by molding the conductive wire 22 with the dust core 21. The dust core 21 has the same configuration as that of the dust core 11 described above.

The coil component 20 in such a form can be easily obtained in a relatively small size. The coil component 20 having a small size, a low iron loss, and a high magnetic permeability is obtained.

Since the conductive wire 22 is embedded in the dust core 21, a gap is less likely to be formed between the conductive wire 22 and the dust core 21. Therefore, vibration caused by magnetostriction of the dust core 21 can be prevented, and generation of noise due to the vibration can also be prevented.

When manufacturing the coil component 20 according to the embodiment as described above, first, the conductive wire 22 is disposed in a cavity of a mold, and an inside of the cavity is filled with granulated powders containing the soft magnetic powder according to the embodiment. That is, the inside of the cavity is filled with the granulated powders so as to include the conductive wire 22.

Next, the granulated powders are pressurized together with the conductive wire 22 to obtain a molded product.

Next, the molded product is subjected to a heat treatment similar to the above-described embodiment. Accordingly, a binder is cured, and the dust core 21 and the coil component 20 can be obtained.

The dust core 21 may contain, as necessary, a soft magnetic powder other than the soft magnetic powder according to the embodiment described above or a non-magnetic powder.

4. Electronic Device

Next, an electronic device including the magnetic element according to the embodiment will be described with reference to FIGS. 10 to 12.

Figure 10:
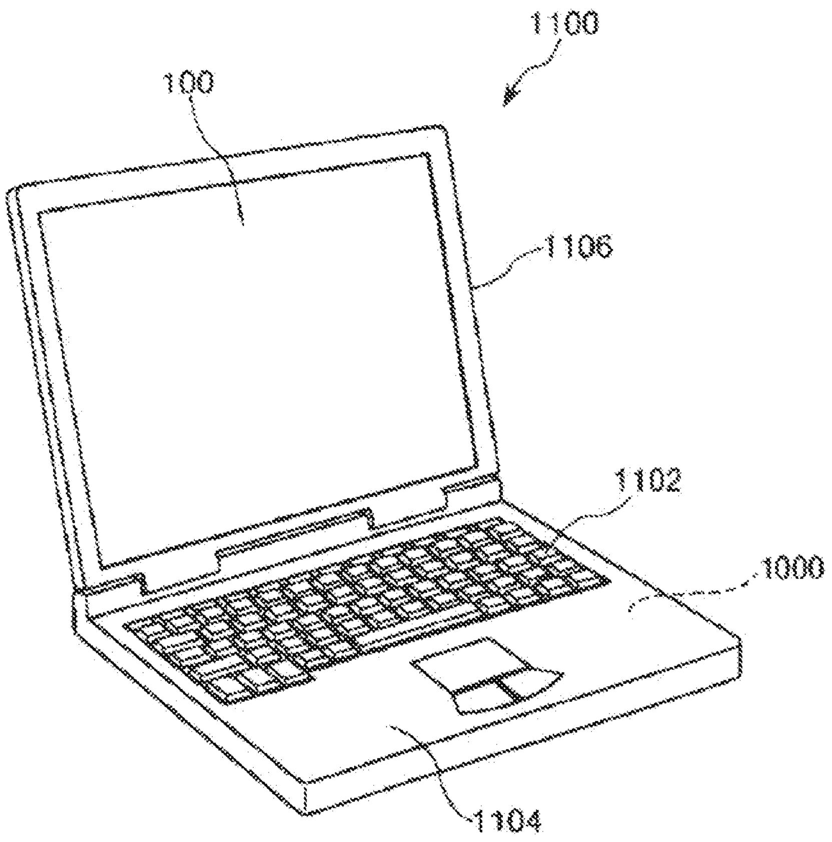
FIG. 10 is a perspective view showing a configuration of a mobile personal computer which is an electronic device including a magnetic element according to the embodiment.

FIG. 10 is a perspective view showing a configuration of a mobile personal computer which is an electronic device including the magnetic element according to the embodiment. A personal computer 1100 shown in FIG. 10 includes a main body 1104 including a keyboard 1102 and a display unit 1106 including a display 100. The display unit 1106 is rotatably supported by the main body 1104 via a hinge structure. Such a personal computer 1100 includes therein a magnetic element 1000 such as a choke coil, an inductor, or a motor for a switching power supply.

Figure 11:
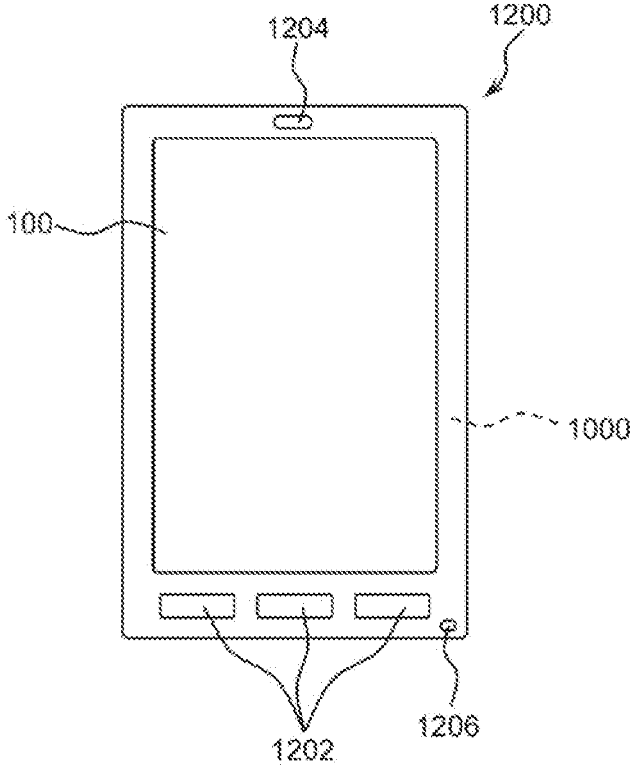
FIG. 11 is a plan view showing a configuration of a smartphone which is an electronic device including the magnetic element according to the embodiment.

FIG. 11 is a plan view showing a configuration of a smartphone which is an electronic device including the magnetic element according to the embodiment. A smartphone 1200 shown in FIG. 11 includes a plurality of operation buttons 1202, an earpiece 1204, and a mouthpiece 1206. The display 100 is disposed between the operation buttons 1202 and the earpiece 1204. Such a smartphone 1200 includes therein the magnetic element 1000 such as an inductor, a noise filter, or a motor.

Figure 12:
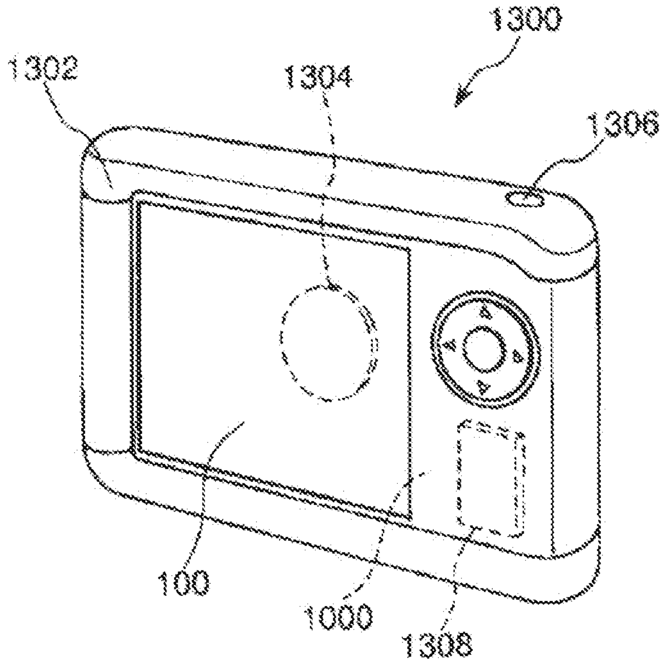
FIG. 12 is a perspective view showing a configuration of a digital still camera which is an electronic device including the magnetic element according to the embodiment.

FIG. 12 is a perspective view showing a configuration of a digital still camera which is an electronic device including the magnetic element according to the embodiment. A digital still camera 1300 photoelectrically converts an optical image of a subject by an imaging element such as a charge coupled device (CCD) so as to generate an imaging signal.

The digital still camera 1300 shown in FIG. 12 includes the display 100 provided at a rear surface of a case 1302. The display 100 functions as a finder which displays the subject as an electronic image. A light receiving unit 1304 including an optical lens, a CCD, or the like is provided on a front surface side of the case 1302, that is, on a back surface side in the drawing.

When a photographer confirms a subject image displayed on the display 100 and presses a shutter button 1306, a CCD imaging signal at this time is transferred to and stored in a memory 1308. Such a digital still camera 1300 also includes therein the magnetic element 1000 such as an inductor or a noise filter.

Examples of the electronic device according to the embodiment include, in addition to the personal computer in FIG. 10, the smartphone in FIG. 11, and the digital still camera in FIG. 12, a mobile phone, a tablet terminal, a watch, ink jet discharge devices such as an ink jet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measurement device, an ultrasonic diagnostic device, and an electronic endoscope, a fish finder, various measuring devices, instruments for a vehicle, an aircraft, and a ship, moving object control devices such as an automobile control device, an aircraft control device, a railway vehicle control device, and a ship control device, and a flight simulator.

As described above, such an electronic device includes the magnetic element according to the embodiment. Accordingly, the effect of the magnetic element having a low iron loss and a high magnetic permeability can be obtained, power consumption and a size of the electronic device can be reduced, and an output of the electronic device can be increased.

The soft magnetic powder, the dust core, the magnetic element, and the electronic device according to the present disclosure are described above based on the preferred embodiment, but the present disclosure is not limited thereto.

For example, although a green compact such as the dust core is described as an application example of the soft magnetic powder according to the present disclosure in the above embodiment, the application example is not limited thereto, and a magnetic device such as a magnetic fluid or a magnetic head may also be used. The shapes of the dust core and the magnetic element are not limited to those shown in the drawings, and may be any shape.

EXAMPLES

Next, specific examples of the present disclosure will be described.

5. Manufacturing of Dust Core

5.1. Sample No. 1

First, raw materials were melted in a high-frequency induction furnace and pulverized by a rotary water atomization method to obtain a soft magnetic powder. Next, classification was performed by an air classifier. A composition of the obtained soft magnetic powder is shown in Table 1. For specifying the composition, a solid emission spectrometer, model: SPECTROLAB, type: LAVMB08A manufactured by SPECTRO, was used. As a result, a total content proportion of impurities was 0.50 atomic % or less.

Next, the grain size distribution of the obtained soft magnetic powder was measured. This measurement was performed by using a Microtrac HRA9320-X100, manufactured by Nikkiso Co., Ltd, i.e., a laser diffraction grain size distribution measuring device. Then, the average grain size D50 of the soft magnetic powder was obtained based on the grain size distribution and was 20 μm.

Next, the obtained soft magnetic powder was heated in a nitrogen atmosphere. Heating conditions are as shown in Table 1.

Next, the obtained soft magnetic powder and an epoxy resin as a binder were mixed to obtain a mixture. An addition amount of the epoxy resin was 2 parts by mass with respect to 100 parts by mass of the soft magnetic powder.

Next, the obtained mixture was stirred and then dried for a short time to obtain a massive dried body. Next, the dried body was sieved with a sieve having an opening of 400 μm, and the dried body was pulverized to obtain granulated powders. The obtained granulated powders were dried at 50° C. for 1 hour.

Next, a mold is filled with the obtained granulated powders, and a molded product was obtained based on the following molding conditions.

Molding Conditions

- Molding method: press molding
- Shape of molded product: ring shape
- Dimensions of molded product: outer diameter 14 mm, inner diameter 8 mm, thickness 3 mm
- Molding pressure: 3 t/cm$^2$ (294 MPa)

Next, the molded product was heated in an air atmosphere at a temperature of 150° C. for 0.5 hours to cure the binder. Accordingly, a dust core was obtained.

5.2. Sample Nos. 2 to 19

A dust core was obtained in the same manner as in the sample No. 1 except that manufacturing conditions of the soft magnetic powder and manufacturing conditions of the dust core were changed as shown in Table 1. The average grain size D50 of each sample was within a range of 10 μm or more and 30 μm or less.

TABLE 1

| Sample No. | Example/ Comparative Example | Atomization method | Composition of soft magnetic powder, etc. Fe x | Cu a | Nb b | Si | B | Total | Si + B |
|---|---|---|---|---|---|---|---|---|---|
| | | | | | atomic % | | | atomic % | |
| No. 1 | Comparative Example | Rotary water | 73.5 | 1.0 | 3.0 | 18.0 | 4.5 | 100 | 22.5 |
| No. 2 | Comparative Example | Rotary water | 73.5 | 1.0 | 3.0 | 13.5 | 9.0 | 100 | 22.5 |
| No. 3 | Comparative Example | Rotary water | 73.5 | 1.0 | 3.0 | 13.5 | 9.0 | 100 | 22.5 |
| No. 4 | Example | Rotary water | 73.5 | 1.0 | 3.0 | 15.8 | 6.8 | 100 | 22.5 |
| No. 5 | Example | Rotary water | 73.5 | 1.0 | 3.0 | 13.5 | 9.0 | 100 | 22.5 |
| No. 6 | Example | Rotary water | 73.5 | 1.0 | 3.0 | 11.3 | 11.3 | 100 | 22.5 |
| No. 7 | Example | Rotary water | 73.5 | 1.0 | 3.0 | 9.0 | 13.5 | 100 | 22.5 |
| No. 8 | Example | Rotary water | 73.5 | 1.0 | 3.0 | 6.8 | 15.8 | 100 | 22.5 |
| No. 9 | Example | Rotary water | 75.0 | 1.0 | 3.0 | 6.3 | 14.7 | 100 | 21.0 |
| No. 10 | Comparative Example | Rotary water | 77.0 | 1.0 | 3.0 | 9.5 | 9.5 | 100 | 19.0 |
| No. 11 | Example | Rotary water | 77.0 | 1.0 | 3.0 | 7.6 | 11.4 | 100 | 19.0 |
| No. 12 | Example | Rotary water | 77.0 | 1.0 | 3.0 | 5.7 | 13.3 | 100 | 19.0 |
| No. 13 | Example | Rotary water | 78.0 | 1.0 | 3.0 | 5.4 | 12.6 | 100 | 18.0 |
| No. 14 | Example | Rotary water | 78.0 | 1.0 | 3.0 | 1.8 | 16.2 | 100 | 18.0 |
| No. 15 | Comparative Example | Rotary water | 79.0 | 1.0 | 3.0 | 5.1 | 11.9 | 100 | 17.0 |
| No. 16 | Example | Rotary water | 79.0 | 1.0 | 3.0 | 1.7 | 15.3 | 100 | 17.0 |
| No. 17 | Comparative Example | Rotary water | 80.0 | 1.0 | 3.0 | 1.6 | 14.4 | 100 | 16.0 |
| No. 18 | Comparative Example | Rotary water | 77.0 | 1.0 | 3.0 | 5.7 | 13.3 | 100 | 19.0 |
| No. 19 | Comparative Example | Rotary water | 77.0 | 1.0 | 3.0 | 5.7 | 13.3 | 100 | 19.0 |

TABLE 1-continued

| | Composition of soft magnetic powder, etc. | | Particle | Heat treatment on soft magnetic powder | | | | |
|---|---|---|---|---|---|---|---|---|
| Sample No. | B/(Si + B) y — | Region — | structure before heat treatment | Heat temperature ° C. | Heat time min | Temperature raising rate ° C./min | Temperature drop rate ° C./min | Oxygen concentration ppm |
| No. 1 | 0.20 | — | Crystal | 560 | 15 | 15 | 55 | 500 |
| No. 2 | 0.40 | A | Amorphous | 530 | 5 | 50 | 55 | 1000 |
| No. 3 | 0.40 | A | Amorphous | 560 | 5 | 15 | 100 | 1000 |
| No. 4 | 0.30 | A | Amorphous | 560 | 15 | 15 | 55 | 1 |
| No. 5 | 0.40 | A | Amorphous | 560 | 15 | 15 | 55 | 5 |
| No. 6 | 0.50 | A | Amorphous | 560 | 15 | 15 | 55 | 10 |
| No. 7 | 0.60 | A | Amorphous | 560 | 15 | 15 | 55 | 100 |
| No. 8 | 0.70 | A | Amorphous | 560 | 15 | 15 | 55 | 100 |
| No. 9 | 0.70 | B | Amorphous | 560 | 15 | 15 | 55 | 500 |
| No. 10 | 0.50 | — | Crystal | 540 | 20 | 25 | 65 | 500 |
| No. 11 | 0.60 | B | Amorphous | 540 | 20 | 25 | 65 | 100 |
| No. 12 | 0.70 | C | Amorphous | 540 | 20 | 25 | 65 | 100 |
| No. 13 | 0.70 | A | Amorphous | 540 | 20 | 25 | 65 | 200 |
| No. 14 | 0.90 | C | Amorphous | 540 | 20 | 30 | 75 | 200 |
| No. 15 | 0.70 | | Crystal | 540 | 20 | 25 | 65 | 100 |
| No. 16 | 0.90 | A | Amorphous | 540 | 20 | 25 | 65 | 1000 |
| No. 17 | 0.90 | — | Crystal | 540 | 20 | 25 | 65 | 100 |
| No. 18 | 0.70 | C | Amorphous | 560 | 15 | 50 | 60 | 800 |
| No. 19 | 0.70 | C | Amorphous | 560 | 15 | 20 | 100 | 800 |

In Table 1, among soft magnetic powders of the respective sample Nos., soft magnetic powders corresponding to the present disclosure are shown as "Examples", and soft magnetic powders not corresponding to the present disclosure are shown as "Comparative Examples".

When x and y in an alloy composition of the soft magnetic powder of each sample No. were positioned inside a region C, "C" was written in a region column, when x and y were positioned outside the region C and inside a region B, "B" was written in the region column, and when x and y were positioned outside the region B and inside a region A, "A" was written in the region column. When x and y were positioned outside the region A, "–" was written in the region column.

6. Evaluation of Soft Magnetic Powder and Dust Core 6.1. Evaluation of Particle Structure of Soft Magnetic Powder The soft magnetic powder obtained in each of Examples and Comparative Examples was processed into a thin piece by a focused ion beam device to obtain a test piece.

Next, the obtained test piece was observed using a scanning transmission electron microscope and was subjected to elemental analysis to obtain a surface analysis image.

Next, a grain size of a crystal grain was measured from an observation image, an area proportion of the crystal grains in a specific range of 1.0 nm or more and 30.0 nm or less was obtained, and the area proportion was regarded as a volume proportion of crystal grains having a predetermined grain size. The measurement results are shown in Table 2.

6.2. Evaluation on XPS Spectrum

For the soft magnetic powder obtained in each of Examples and Comparative Examples, an XPS spectrum was obtained by an X-ray photoelectron spectrometer. A value of S2/S1, a value of SD/SC, and a value of R(Si)/R(Fe) were calculated based on the XPS spectrum. The calculation results are shown in Table 2.

FIGS. 2 to 6 show chemical state analysis results and qualitative quantitative analysis results obtained for soft magnetic powders of the sample No. 3 (Comparative Example) and the sample No. 5 (Example).

In addition, FIGS. 13 to 17 show chemical state analysis results and qualitative quantitative analysis results obtained for soft magnetic powders of the sample No. 19 (Comparative Example) and the sample No. 15 (Example).

Figure 13:
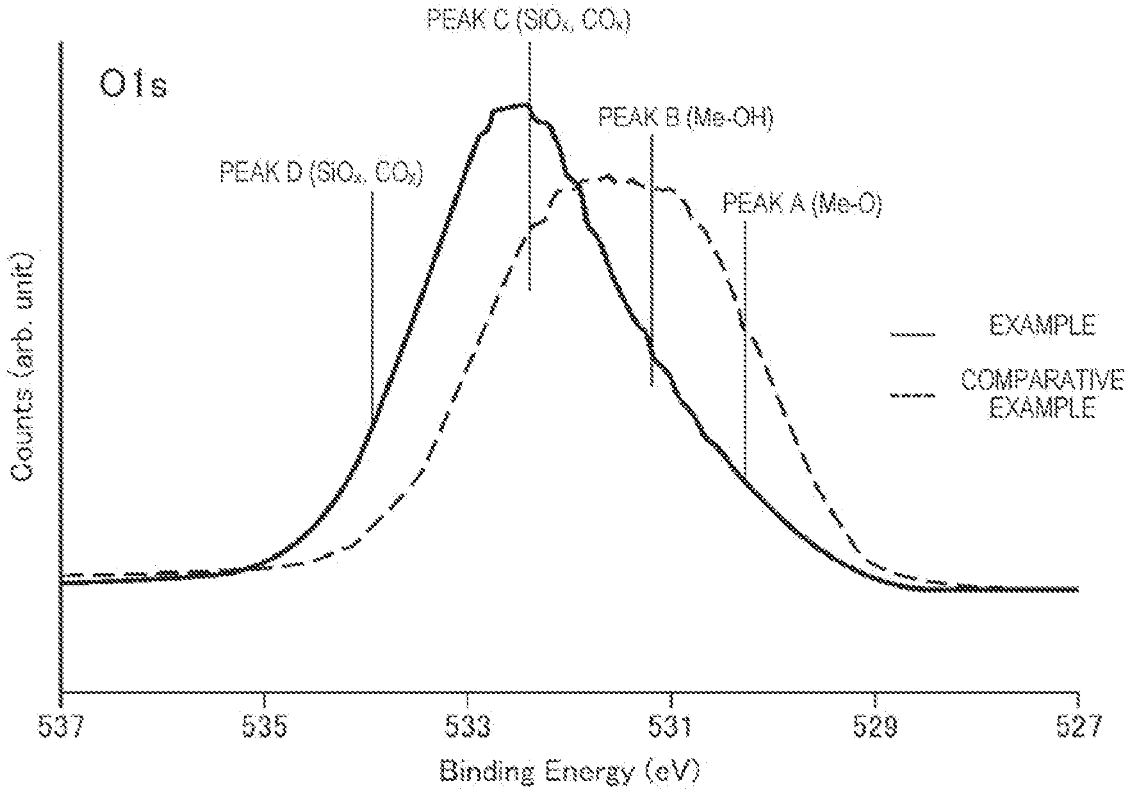
FIG. 13 is an enlarged view of an O1s peak of an XPS spectrum obtained from particles of the soft magnetic powder.

FIG. 13 is an enlarged view of an O1s peak of the XPS spectrum obtained from particles of the soft magnetic powder. In FIG. 13, an O1s peak corresponding to the embodiment (an O1s peak of Example) is indicated by a solid line, and an O1s peak that does not correspond to the embodiment (an O1s peak of Comparative Example) is indicated by a broken line.

Figure 14:
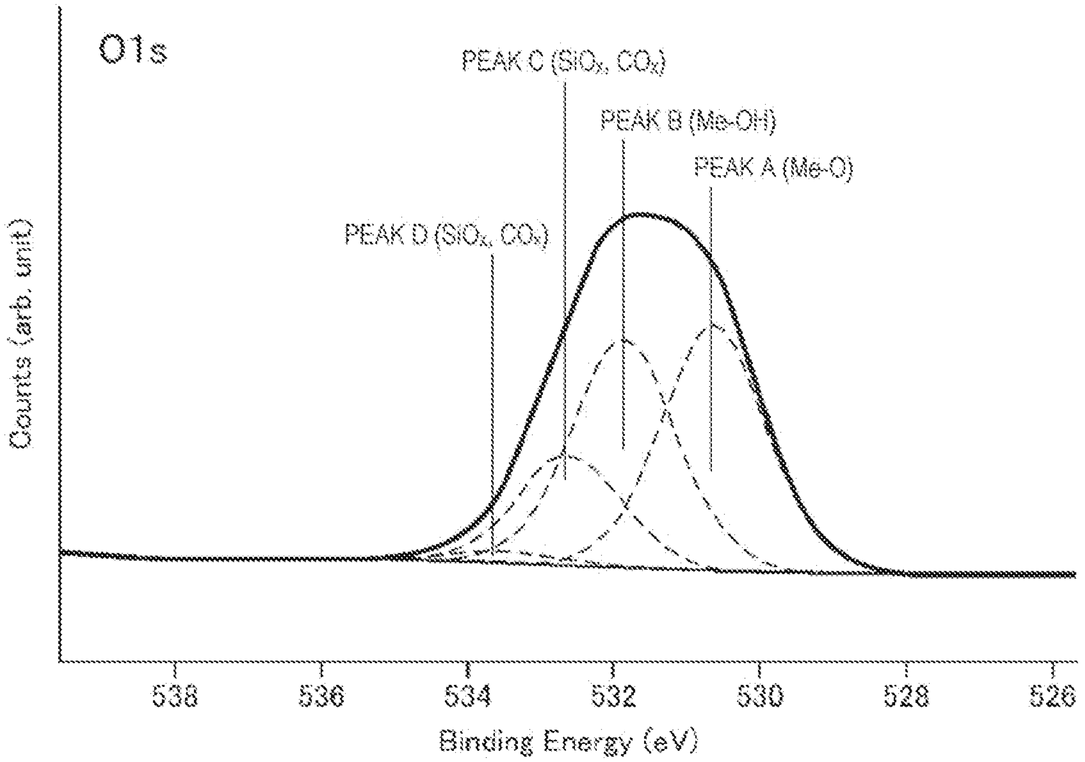
FIG. 14 is a diagram showing four peaks obtained by separating the O1s peak shown in FIG. 13 by fitting processing.

FIG. 14 is a diagram showing four peaks obtained by separating the O1s peak shown in FIG. 13 by fitting processing.

Figure 15:
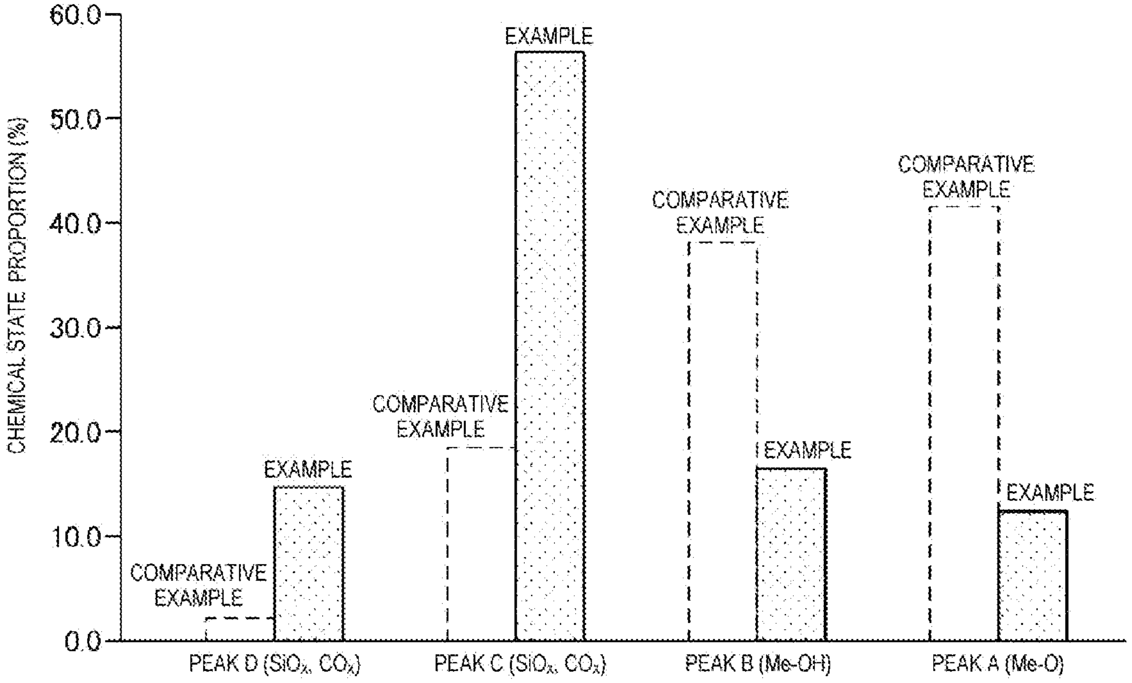
FIG. 15 is a bar graph obtained by measuring areas of the four peaks shown in FIG. 14, calculating proportions with respect to the entire area as chemical state proportions, and comparing the chemical state proportions.

FIG. 15 is a bar graph obtained by measuring areas of the four peaks shown in FIG. 14, calculating proportions with respect to the entire area as chemical state proportions, and comparing the chemical state proportions. In FIG. 15, a result obtained by performing the fitting processing on the O1s peak of Example is indicated by a solid line, and a result obtained by performing the fitting processing on the O1s peak of Comparative Example is indicated by a broken line.

Figure 16:
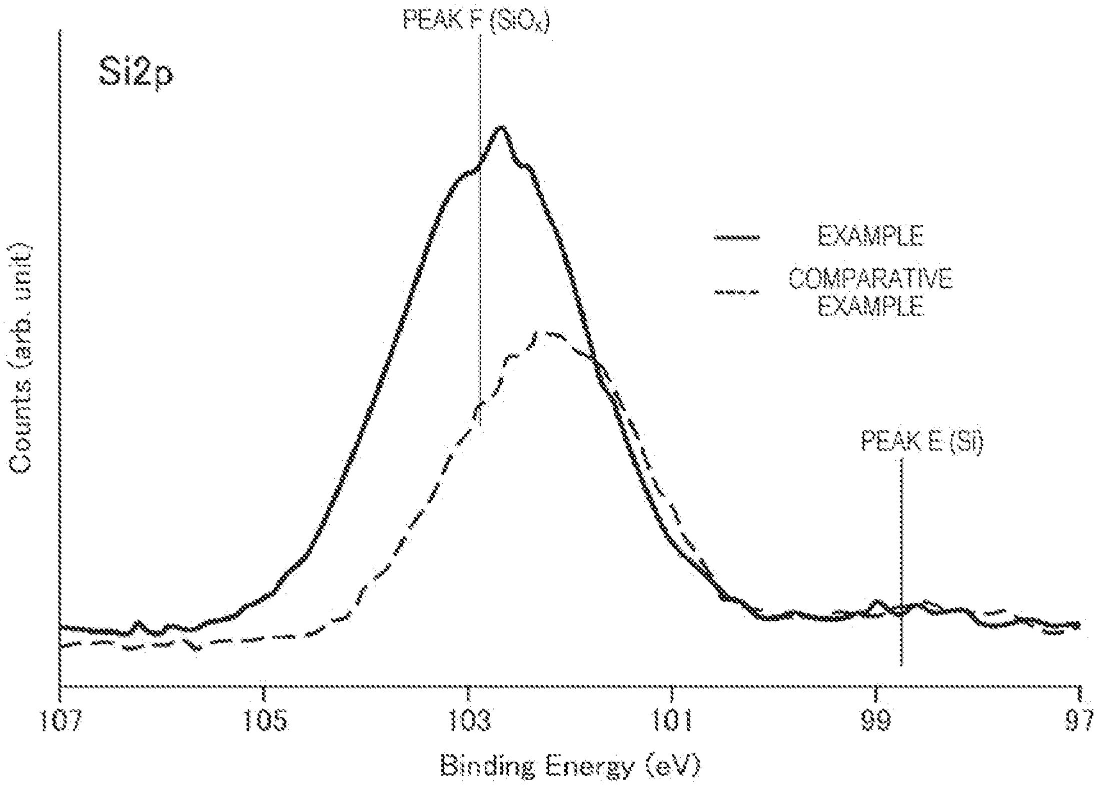
FIG. 16 is an enlarged view of a Si2p peak included in the XPS spectrum obtained from particles of the soft magnetic powder.

FIG. 16 is an enlarged view of a Si2p peak included in the XPS spectrum obtained from particles of the soft magnetic powder.

FIG. 17 is a table showing a result of qualitative quantitative analysis obtained for the soft magnetic powder according to the embodiment (result of qualitative quantitative analysis of Example) and a result of qualitative quantitative analysis of Comparative Example.

6.3. Electric Resistance Value of Green Compact

The electrical resistance value of each of green compacts of the soft magnetic powders obtained in Examples and Comparative Examples was measured. The measured resistance value was evaluated according to the following evaluation criteria.

A: The resistance value is 5.0 kΩ or more.

B: The resistance value is 3.0 kΩ or more and less than 5.0 kΩ.

C: The resistance value is 0.3 kΩ or more and less than 3.0 kΩ.

D: The resistance value is less than 0.3 kΩ.

The evaluation results are shown in Table 2.

6.4. Measurement of Coercive Force of Soft Magnetic Powder

The coercive force of each of the soft magnetic powders obtained in Examples and Comparative Examples was measured. The measured coercive force was evaluated according to the following evaluation criteria.

A: The coercive force is less than 0.90 Oe.

B: The coercive force is 0.90 Oe or more and less than 1.33 Oe.

C: The coercive force is 1.33 Oe or more and less than 1.67 Oe.

D: The coercive force is 1.67 Oe or more and less than 2.00 Oe.

E: The coercive force is 2.00 Oe or more and less than 2.33 Oe.

F: The coercive force is 2.33 Oe or more.

The evaluation results are shown in Table 2.

6.5. Calculation of Saturation Magnetic Flux Density of Soft Magnetic Powder

The saturation magnetic flux density each of the soft magnetic powders obtained in Examples and Comparative Examples was calculated. The calculation results are shown in Table 2.

6.6. Measurement of Magnetic Permeability of Green Compact

The Magnetic permeability of each of the green compacts of the soft magnetic powders obtained in Examples and Comparative Examples was measured. The measurement results are shown in Table 2.

6.7. Measurement of Iron Loss of Dust Core

The iron loss of each of dust cores obtained in Examples and Comparative Examples was measured based on the following measurement conditions.

Measurement device: BH analyzer, SY-8258 manufactured by Iwatsu Electric Co., Ltd.

Measurement frequency: 900 kHz

Winding number of winding: 36 times on primary side and 36 times on secondary side Wire diameter of winding: 0.5 mm Maximum magnetic flux density: 50 mT The measurement results are shown in Table 2.

TABLE 2

| | | Evaluation result | | | | | | | | |
|---|---|---|---|---|---|---|---|---|---|---|
| Sample No. | Example/ Comparative Example | Content proportion of crystal grain having predetermined grain size vol % | XPS spectrum S2/S1 — | XPS spectrum SD/SC — | XPS spectrum R(Si)/R(Fe) — | Electric resistance value of green compact — | Coercive force — | Saturation magnetic flux density T | Magnetic permeability — | Iron loss kW/m$^3$ |
| No. 1 | Comparative Example | 0 | 1.6 | 0.18 | 3.2 | C | F | 1.05 | 16.1 | 27400 |
| No. 2 | Comparative Example | 35 | 1.2 | 0.11 | 2.2 | D | A | 1.06 | 17.3 | 18500 |
| No. 3 | Comparative Example | 30 | 1.3 | 0.13 | 2.4 | D | A | 1.07 | 17.5 | 16600 |
| No. 4 | Example | 69 | 2.9 | 0.45 | 16.8 | A | B | 1.14 | 23.3 | 3014 |
| No. 5 | Example | 71 | 2.8 | 0.41 | 12.3 | A | A | 1.18 | 23.6 | 4200 |
| No. 6 | Example | 73 | 2.6 | 0.35 | 11.0 | A | A | 1.22 | 21.1 | 4987 |
| No. 7 | Example | 81 | 2.3 | 0.31 | 10.5 | A | A | 1.26 | 20.1 | 5507 |
| No. 8 | Example | 83 | 2.2 | 0.28 | 8.8 | A | B | 1.29 | 19.6 | 6179 |
| No. 9 | Example | 85 | 1.9 | 0.25 | 7.5 | A | B | 1.33 | 20.1 | 5768 |
| No. 10 | Comparative Example | 0 | 1.7 | 0.19 | 3.3 | D | F | 1.32 | 17.3 | 49600 |
| No. 11 | Example | 8 | 3.1 | 0.28 | 3.6 | A | A | 1.37 | 22.8 | 4096 |
| No. 12 | Example | 67 | 2.5 | 0.26 | 3.5 | A | A | 1.41 | 20.3 | 7100 |
| No. 13 | Example | 59 | 2.4 | 0.24 | 3.4 | A | C | 1.38 | 15.0 | 10464 |
| No. 14 | Example | 51 | 1.6 | 0.16 | 2.6 | A | A | 1.42 | 18.0 | 6816 |
| No. 15 | Comparative Example | 0 | 1.3 | 0.18 | 2.3 | D | F | 1.39 | 18.1 | 40000 |
| No. 16 | Example | 65 | 1.5 | 0.15 | 2.5 | B | C | 1.43 | 22.2 | 8500 |
| No. 17 | Comparative Example | 0 | 0.9 | 0.09 | 1.3 | D | F | 1.40 | 17.1 | 51200 |
| No. 18 | Comparative Example | 21 | 0.3 | 0.05 | 1.1 | D | E | 1.41 | 17.1 | 43200 |
| No. 19 | Comparative Example | 25 | 0.5 | 0.07 | 1.3 | D | E | 1.40 | 17.0 | 41600 |

As is apparent from Table 2, in the soft magnetic powder obtained in each Example, both high insulation and a high magnetic permeability are achieved. Therefore, according to the present disclosure, it is clear that it is possible to implement a soft magnetic powder from which a green compact having a high insulation resistance value and a high magnetic permeability can be manufactured.

What is claimed is:

1. A soft magnetic powder comprising:

a particle having a composition represented by $Fe_xCu_aNb_b(Si_{1-y}B_y)_{100-x-a-b}$, a, b, and x being numbers whose units are atomic %, in which $0.3 \leq a \leq 2.0$, $2.0 \leq b \leq 4.0$, and $73.0 \leq x \leq 79.5$, and y being a number satisfying $f(x) \leq y \leq 0.99$, and $f(x)=(4\times 10^{-34})x^{17.56}$, wherein the particle contains a crystal grain having a grain size of 1.0 nm or more and 30.0 nm or less, when an XPS spectrum of the particle is obtained by X-ray photoelectron spectroscopy and fitting processing of separating an O1s peak of the XPS spectrum into a plurality of different chemical states is performed, the O1s peak is separated into at least one first element peak having a peak top binding energy of 532 eV or less and at least one second element peak having a peak top binding energy of more than 532 eV, S2/S1 is 1.5 or more, where S1 is a total area of the first element peak and S2 is a total area of the second element peak, the first element peak is indicative of the composition containing at least one of oxygen and a hydroxy group bonded to metal, and the second element peak is indicative of the composition containing at least one of silicon oxide and carbon oxide, and when a cylindrical green compact with an inner diameter of 8 mm and a mass of 0.7 g is formed using the soft magnetic powder and the green compact is compressed in an axial direction under a load of 20 kgf, a resistance value of the green compact in the axial direction is 0.3 kΩ or more and 30.0 kΩ or less.

2. The soft magnetic powder according to claim 1, wherein

R(Si)/R(Fe) is 2.5 or more, where R(Si) is a concentration of Si in an atomic ratio, and R(Fe) is a concentration of Fe in an atomic ratio when qualitative quantitative analysis of the particle is performed based on the XPS spectrum.

3. The soft magnetic powder according to claim 1, wherein a content proportion of the crystal grain in the particle is 30 vol % or more.

4. The soft magnetic powder according to claim 1, wherein an average grain size is 1 μm or more and 50 μm or less.

5. A dust core comprising:

the soft magnetic powder according to claim 1.

6. A magnetic element comprising:

the dust core according to claim 5.

7. An electronic device comprising:

the magnetic element according to claim 6.

* * * * *